(12) United States Patent
Brown Elliott et al.

(10) Patent No.: US 8,405,692 B2
(45) Date of Patent: Mar. 26, 2013

(54) COLOR FLAT PANEL DISPLAY ARRANGEMENTS AND LAYOUTS WITH REDUCED BLUE LUMINANCE WELL VISIBILITY

(75) Inventors: Candice Hellen Brown Elliott, Santa Rosa, CA (US); Thomas Lloyd Credelle, Morgan Hill, CA (US); MoonHwan Im, Cupertino, CA (US)

(73) Assignee: Samsung Display Co., Ltd. (KR)

( * ) Notice: Subject to any disclaimer, the term of this patent is extended or adjusted under 35 U.S.C. 154(b) by 694 days.

(21) Appl. No.: 11/734,053

(22) Filed: Apr. 11, 2007

(65) Prior Publication Data

US 2007/0176950 A1 Aug. 2, 2007

Related U.S. Application Data

(60) Division of application No. 10/278,328, filed on Oct. 22, 2002, now abandoned, which is a continuation-in-part of application No. 10/024,326, filed on Dec. 14, 2001, now Pat. No. 6,950,115.

(51) Int. Cl.
G09G 5/02 (2006.01)
(52) U.S. Cl. .................................. 345/694; 345/695
(58) Field of Classification Search .............. 345/694, 345/695; 358/3.13–3.2
See application file for complete search history.

(56) References Cited

U.S. PATENT DOCUMENTS

| | | | |
|---|---|---|---|
| 3,971,065 A | 7/1976 | Bayer | |
| 4,353,062 A | 10/1982 | Lorteije et al. | |
| 4,392,209 A * | 7/1983 | DeBar | 365/110 |
| 4,593,978 A | 6/1986 | Mourey et al. | |
| 4,642,619 A | 2/1987 | Togashi | |
| 4,651,148 A | 3/1987 | Takeda et al. | |
| 4,751,535 A | 6/1988 | Myers | |
| 4,773,737 A | 9/1988 | Yokono et al. | |
| 4,781,438 A | 11/1988 | Noguchi | |
| 4,786,964 A | 11/1988 | Plummer et al. | |
| 4,792,728 A | 12/1988 | Chang et al. | |
| 4,800,375 A | 1/1989 | Silverstein et al. | |
| 4,853,592 A | 8/1989 | Strathman | |
| 4,874,986 A | 10/1989 | Menn et al. | |
| 4,886,343 A | 12/1989 | Johnson | |
| 4,908,609 A | 3/1990 | Stroomer | |
| 4,920,409 A | 4/1990 | Yamagishi | |
| 4,946,259 A | 8/1990 | Matino et al. | |

(Continued)

FOREIGN PATENT DOCUMENTS

DE  197 46 329 A1   3/1999
DE  299 09 537 U1  10/1999

(Continued)

OTHER PUBLICATIONS

Adobe Systems, Inc. website, http://www.adobe.com/products/acrobat/cooltype.html.

(Continued)

*Primary Examiner* — Kevin M Nguyen
*Assistant Examiner* — Kenneth B Lee, Jr.
(74) *Attorney, Agent, or Firm* — Innovation Counsel LLP

(57) ABSTRACT

A transflective display panel substantially comprises a plurality of a sub-pixel grouping substantially comprising a plurality of at least first and second color sub-pixels. The plurality of the sub-pixel grouping forms an array across said display panel in a plurality of rows and columns. The first color sub-pixel is a substantially dark color sub-pixel disposed in the plurality of the sub-pixel grouping across said display panel so as to form a substantially vertical line down said display. Each sub-pixel further comprises an optical via, and the optical vias are formed in non-uniform positions upon said dark color sub-pixels.

13 Claims, 16 Drawing Sheets

U.S. PATENT DOCUMENTS

| | | |
|---|---|---|
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,052,785 A | 10/1991 | Takimoto et al. |
| 5,113,274 A | 5/1992 | Takahashi et al. |
| 5,132,674 A | 7/1992 | Bottorf |
| 5,144,288 A | 9/1992 | Hamada et al. |
| 5,184,114 A | 2/1993 | Brown |
| 5,189,404 A | 2/1993 | Masimo et al. |
| 5,233,385 A | 8/1993 | Sampsell |
| 5,311,205 A | 5/1994 | Hamada et al. |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,436,747 A | 7/1995 | Suzuki |
| 5,461,503 A | 10/1995 | Deffontaines et al. |
| 5,485,293 A | 1/1996 | Robinder |
| 5,535,028 A | 7/1996 | Bae et al. |
| 5,541,653 A | 7/1996 | Peters et al. |
| 5,561,460 A | 10/1996 | Katoh et al. |
| 5,563,621 A | 10/1996 | Silsby |
| 5,579,027 A | 11/1996 | Sakurai et al. |
| 5,646,702 A | 7/1997 | Akinwande et al. |
| 5,648,793 A | 7/1997 | Chen |
| 5,729,244 A | 3/1998 | Lockwood |
| 5,754,226 A | 5/1998 | Yamada et al. |
| 5,773,927 A * | 6/1998 | Zimlich ............ 313/495 |
| 5,792,579 A | 8/1998 | Phillips |
| 5,808,594 A | 9/1998 | Tsuboyama et al. |
| 5,815,101 A | 9/1998 | Fonte |
| 5,821,913 A | 10/1998 | Mamiya |
| 5,899,550 A | 5/1999 | Masaki |
| 5,949,496 A | 9/1999 | Kim |
| 5,971,546 A | 10/1999 | Park |
| 5,973,664 A | 10/1999 | Badger |
| 6,002,446 A | 12/1999 | Eglit |
| 6,005,692 A | 12/1999 | Stahl |
| 6,008,868 A | 12/1999 | Silverbrook |
| 6,034,666 A | 3/2000 | Kanai et al. |
| 6,037,719 A | 3/2000 | Yap et al. |
| 6,038,031 A | 3/2000 | Murphy |
| 6,049,626 A | 4/2000 | Kim |
| 6,061,533 A | 5/2000 | Kajiwara |
| 6,064,363 A | 5/2000 | Kwon |
| 6,072,272 A * | 6/2000 | Rumbaugh ............ 313/470 |
| 6,072,445 A | 6/2000 | Spitzer et al. |
| 6,097,367 A | 8/2000 | Kuriwaki et al. |
| 6,100,861 A | 8/2000 | Cohen et al. |
| 6,108,122 A | 8/2000 | Ulrich et al. |
| 6,144,352 A | 11/2000 | Matsuda et al. |
| 6,147,664 A | 11/2000 | Hansen |
| 6,151,001 A | 11/2000 | Anderson et al. |
| 6,160,535 A | 12/2000 | Park |
| 6,184,903 B1 | 2/2001 | Omori |
| 6,188,385 B1 | 2/2001 | Hill et al. |
| 6,198,507 B1 | 3/2001 | Ishigami |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,262,710 B1 | 7/2001 | Smith |
| 6,271,891 B1 | 8/2001 | Ogawa et al. |
| 6,299,329 B1 | 10/2001 | Mui et al. |
| 6,326,981 B1 * | 12/2001 | Mori et al. ............ 345/695 |
| 6,327,008 B1 | 12/2001 | Fujiyoshi |
| 6,342,876 B1 | 1/2002 | Kim |
| 6,346,972 B1 | 2/2002 | Kim |
| 6,360,023 B1 | 3/2002 | Betrisey et al. |
| 6,377,262 B1 | 4/2002 | Hitchcock et al. |
| 6,388,644 B1 | 5/2002 | De Zwart et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,441,867 B1 | 8/2002 | Daly |
| 6,453,067 B1 | 9/2002 | Morgan et al. |
| 6,466,618 B1 | 10/2002 | Messing et al. |
| 6,522,377 B2 * | 2/2003 | Kim et al. ............ 349/114 |
| 6,552,706 B1 | 4/2003 | Ikeda et al. |
| 6,628,068 B1 | 9/2003 | Rorison et al. |
| 6,661,429 B1 | 12/2003 | Phan |
| 6,680,761 B1 | 1/2004 | Greene et al. |
| 6,681,053 B1 | 1/2004 | Zhu |
| 6,714,206 B1 | 3/2004 | Martin et al. |
| 6,714,212 B1 | 3/2004 | Tsuboyama et al. |
| 6,738,204 B1 | 5/2004 | Chuang et al. |
| 6,750,875 B1 | 6/2004 | Keely, Jr. et al. |
| 6,833,890 B2 | 12/2004 | Hong et al. |
| 6,836,300 B2 | 12/2004 | Choo et al. |
| 6,850,294 B2 | 2/2005 | Roh et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,378 B2 | 6/2005 | Cok |
| 6,903,754 B2 | 6/2005 | Brown Elliott |
| 6,930,676 B2 | 8/2005 | De Haan et al. |
| 6,950,115 B2 | 9/2005 | Brown Elliott |
| 6,989,876 B2 | 1/2006 | Song et al. |
| 2001/0017515 A1 | 8/2001 | Kusunoki et al. |
| 2001/0017607 A1 | 8/2001 | Kwon et al. |
| 2001/0040645 A1 | 11/2001 | Yamazaki |
| 2002/0012071 A1 | 1/2002 | Sun |
| 2002/0015110 A1 | 2/2002 | Brown Elliott |
| 2002/0017645 A1 | 2/2002 | Yamazaki et al. |
| 2002/0122160 A1 | 9/2002 | Kunzman |
| 2002/0140831 A1 | 10/2002 | Hayashi |
| 2002/0190648 A1 | 12/2002 | Bechtel et al. |
| 2003/0011613 A1 | 1/2003 | Booth, Jr. |
| 2003/0043567 A1 | 3/2003 | Hoelen et al. |
| 2003/0071826 A1 | 4/2003 | Goertzen |
| 2003/0071943 A1 | 4/2003 | Choo et al. |
| 2003/0090581 A1 | 5/2003 | Credelle et al. |
| 2003/0128179 A1 | 7/2003 | Credelle |
| 2003/0128225 A1 | 7/2003 | Credelle et al. |
| 2003/0218618 A1 | 11/2003 | Phan |
| 2004/0021804 A1 | 2/2004 | Hong et al. |
| 2004/0046714 A1 | 3/2004 | Brown Elliott |
| 2004/0061710 A1 | 4/2004 | Messing et al. |
| 2004/0080479 A1 | 4/2004 | Credelle |
| 2004/0114046 A1 | 6/2004 | Lee et al. |
| 2004/0150651 A1 | 8/2004 | Phan |
| 2004/0155895 A1 | 8/2004 | Lai |
| 2004/0169807 A1 | 9/2004 | Rho et al. |
| 2004/0179160 A1 | 9/2004 | Rhee et al. |
| 2004/0239813 A1 | 12/2004 | Klompenhouwer |
| 2004/0239837 A1 | 12/2004 | Hong et al. |
| 2005/0007327 A1 | 1/2005 | Elion et al. |
| 2005/0007539 A1 | 1/2005 | Taguchi et al. |
| 2005/0024380 A1 | 2/2005 | Lin et al. |
| 2005/0040760 A1 | 2/2005 | Taguchi et al. |
| 2005/0068477 A1 | 3/2005 | Shin et al. |
| 2005/0083356 A1 | 4/2005 | Roh et al. |
| 2005/0140634 A1 | 6/2005 | Takatori |
| 2005/0151752 A1 | 7/2005 | Phan |
| 2005/0169551 A1 | 8/2005 | Messing et al. |

FOREIGN PATENT DOCUMENTS

| | | |
|---|---|---|
| DE | 199 23 527 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 671 650 A2 | 9/1995 |
| EP | 0 793 214 A1 | 2/1996 |
| EP | 0 812 114 A1 | 12/1997 |
| EP | 0 878 969 A3 | 11/1998 |
| EP | 0 899 604 A2 | 3/1999 |
| EP | 1 083 539 A2 | 3/2001 |
| EP | 1 261 014 A2 | 11/2002 |
| EP | 1 381 020 A2 | 1/2004 |
| GB | 2 133 912 A | 8/1984 |

| | | |
|---|---|---|
| GB | 2 146 478 A | 4/1985 |
| JP | 60-107022 | 6/1985 |
| JP | 02-000826 A | 1/1990 |
| JP | 02-983027 B2 | 4/1991 |
| JP | 03-78390 | 4/1991 |
| JP | 06-102503 | 4/1994 |
| JP | 06-214250 | 8/1994 |
| JP | 08-202317 | 8/1996 |
| JP | 11-282008 | 10/1999 |
| JP | 2001203919 | 7/2001 |
| JP | 2002215082 A | 7/2002 |
| JP | 2004-004822 | 1/2004 |
| TW | 417077 B | 1/2001 |
| WO | WO 97/23860 | 7/1997 |
| WO | 00/21037 A1 | 4/2000 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/65432 | 11/2000 |
| WO | WO 00/67196 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/059685 A2 | 8/2002 |
| WO | WO 03/014819 A1 | 2/2003 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |

OTHER PUBLICATIONS

Betrisey, C., et al., Displaced Filtering for Patterned Displays, SID Symp. Digest 1999, pp. 296-299.

Brown Elliott, C., "Active Matrix Display . . . ", IDMC 2000, 185-189, Aug. 2000.

Brown Elliott, C., "Color Subpixel Rendering Projectors and Flat Panel Displays," SMPTE, Feb. 27-Mar. 1, 2003, Seattle, WA pp. 1-4.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, "Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002, pp. 115-117.

Brown Elliott, C, "Pentile Matrix™ Displays and Drivers" ADEAC Proceedings Paper, Portland OR., Oct. 2005.

Brown Elliott, C, "Reducing Pixel Count Without Reducing Image Quality", Information Display Dec. 1999, vol. 1, pp. 22-25.

Carvajal, D., "Big Publishers Looking Into Digital Books," The NY Times, Apr. 3, 2000, Business/ Financial Desk.

"ClearType magnified", Wired Magazine, Nov. 8, 1999, Microsoft Typography, article posted Nov. 8, 1999, last updated Jan. 27, 1999 1 page.

Credelle, Thomas, "P-00: MTF of High-Resolution PenTile Matrix Displays", Eurodisplay 02 Digest, 2002 pp. 1-4.

Daly, Scott, "Analysis of Subtriad Addressing Algorithms by Visual System Models",SID Symp. Digest, Jun. 2001 pp. 1200-1203.

E-Reader Devices and Software, Jan. 1, 2001, Syllabus, http://www.campus-technology.com/article.asp?id=419.

Feigenblatt, R.I., Full-color imaging on amplitude-quantized color mosaic displays, SPIE, 1989, pp. 199-204.

Feigenblatt, Ron, "Remarks on Microsoft ClearType™", http://www.geocities.com/SiliconValley/Ridge/6664/ClearType.html, Dec. 5 1998, Dec. 7 1998, Dec. 12, 1999, Dec. 26 1999, Dec. 30 1999 and Jun. 19 2000, 30 pages.

Gibson, S., "Sub-Pixel Rendering; How it works," Gibson Research Corp., http://www.grc.com/ctwhat.html.

Johnston, Stuart, "An Easy Read: Microsoft's ClearType," InformationWeek Online, Redmond WA, Nov. 23, 1998. 3 pages.

Johnston, Stuart, "Clarifying ClearType," InformationWeek Online, Redmond WA, Jan. 4, 1999, 4 pages.

Just Outta Beta, Wired Magazine, Nov. 1999 Issue 7-12, 3 pages.

Klompenhouwer, Michiel, Subpixel Image Scaling for Color Matrix Displays, SID Symp. Digest, May 2002, pp. 176-179.

Krantz, John et al., Color Matrix Display Image Quality: The Effects of Luminance . . . SID 90 Digest, pp. 29-32.

Lee, Baek-woon et al., 40.5L: Late-News Paper: TFT-LCD with RGBW Color system, SID 03 Digest, 2003, pp. 1212-1215.

Markoff, John, Microsoft's Cleartype Sets Off Debate on Originality, NY Times, Dec. 7, 1998, 5 pages.

Martin, R., et al., "Detectability of Reduced Blue-Pixel Count in Projection Displays," SID Symp. Digest, May 1993, pp. 606-609.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

"Microsoft ClearType," website, Mar. 26, 2003, 4 pages.

Microsoft Corp. website, http://www.microsoft.com/typography/cleartype, 7 pages.

Microsoft press release, Microsoft Research Announces Screen Display Breakthrough at COMDEX/Fall '98; . . . Nov. 15, 1998.

Murch, M., "Visual Perception Basics," SID Seminar, 1987, Tektronix Inc, Beaverton Oregon.

Okumura et al., "A New Flicker-Reduction Drive Method for High Resolution LCTVs", SID Digest,pp. 551-554, 2001.

Platt, John, Optimal Filtering for Patterned Displays, IEEE Signal Processing Letters, 2000, 4 pages.

PCT International Search Report dated Jul. 30, 2003 for PCT/US02/39860 (U.S. Appl. No. 10/278,328).

Poor, Alfred, "LCDs: The 800-pound Gorilla," Information Display, Sep. 2002, pp. 18-21.

Wandell, Brian A., Stanford University, "Fundamentals of Vision: Behavior . . . ," Jun. 12, 1994, Society for Information Display (SID) Short Course S-2, Fairmont Hotel, San Jose, California.

Werner, Ken, "OLEDS, OLEDS, Everywhere . . . ," Information Display, Sep. 2002, pp. 12-15.

USPTO, Non-Final Office Action, dated Mar. 18, 2003 in U.S. Appl. No. 09/628,122.

Clairvoyante Inc., Response to Non-Final Office Action, dated Jul. 18, 2003 in U.S. Appl. No. 09/628,122.

USPTO, Final Office Action, dated Oct. 3, 2003 in U.S. Appl. No. 09/628,122.

Clairvoyante Inc., Response to Final Office Action, dated Jan. 16, 2004 in U.S. Appl. No. 09/628,122.

USPTO, Non-Final Office Action, dated Apr. 19, 2004 in U.S. Appl. No. 09/628,122.

Clairvoyante Inc., Response to Non-Final Office Action, dated Aug. 5, 2004 in U.S. Appl. No. 09/628,122.

USPTO, Non-Final Office Action, dated Jan. 11, 2005 in U.S. Appl. No. 09/628,122.

USPTO, Final Office Action, dated Jan. 28, 2005 in U.S. Appl. 09/628,122.

Clairvoyante Inc., Response to Final Office Action, dated Jan. 31, 2005 in U.S. Appl. No. 09/628,122.

USPTO, Non-Final Office Action, dated Feb. 10, 2006 in U.S. Appl. No. 09/628,122.

Clairvoyante Inc., Response to Non-Final Office Action, dated Jul. 1, 2006 in U.S. Appl. No. 09/628,122.

USPTO, Non-Final Office Action, dated Mar. 9, 2004 in US Patent No. 6,903,754 (U.S. Appl. No. 09/916,232).

USPTO, Non-Final Office Action, dated May 6, 2004 in US Patent No. 6,903,754 (U.S. Appl. No. 09/916,232).

Clairvoyante Inc., Response to Non-Final Office Action, dated Sep. 3, 2004 in US Patent No. 6,903,754 (U.S. Appl. No. 09/916,232).

USPTO, Final Office Action, dated Jan. 6, 2005 in US Patent No. 6,903,754 (U.S. Appl. No. 09/916,232).

Clairvoyante Inc., Response to Final Office Action, dated Jan. 28, 2005 in US Patent No. 6,903,754 (U.S. Appl. No. 09/916,232).

USPTO, Non-Final Office Action, dated Jan. 15, 2004 in US Patent No. 6,950,115 (U.S. Appl. No. 10/024,326).

Clairvoyante Inc., Response to Non-Final Office Action, dated May 10, 2004 in US Patent No. 6,950,115 (U.S. Appl. No. 10/024,326).

USPTO, Non-Final Office Action, dated Jun. 28, 2004 in US Patent No. 6,950,115 (U.S. Appl. No. 10/024,326).
Clairvoyante Inc., Response to Non-Final Office Action, dated Oct. 27, 2004 in US Patent No. 6,950,115 (U.S. Appl. No. 10/024,326).
USPTO, Notice of Allowance, dated Jun. 1, 2005 in US Patent No. 6,950,115 (U.S. Appl. No. 10/024,326).
USPTO, Non-Final Office Action, dated Jul. 28, 2005 in US Patent Publication No. 2003/0090581, (U.S. Appl. No. 10/278,393).
Clairvoyante Inc, Response to Non-Final Office Action, dated Jan. 30, 2006 in US Patent Publication No. 2003/0090581, (U.S. Appl. No. 10/278,393).
USPTO, Final Office Action, dated Apr. 18, 2006 in US Patent Publication No. 2003/0090581, (U.S. Appl. No. 10/278,393).
USPTO, Non-Final Office Action, dated Nov. 16, 2004 in US Patent Publication No. 2003/0128225, (U.S. Appl. No. 10/278,353).
Clairvoyante Inc, Response to Non-Final Office Action, dated Apr. 15, 2005 in US Patent Publication No. 2003/0128225, (U.S. Appl. No. 10/278,353).
USPTO, Non-Final Office Action, dated Jul. 12, 2005 in US Patent Publication No. 2003/0128225, (U.S. Appl. No. 10/278,353).
Clairvoyante Inc, Response to Non-Final Office Action, dated Jan. 12, 2006 in US Patent Publication No. 2003/0128225, (U.S. Appl. No. 10/278,353).
USPTO, Final Office Action, dated Apr. 18, 2006 in US Patent Publication No. 2003/0128225, (U.S. Appl. No. 10/278,353).
USPTO, Non-Final Office Action, dated Nov. 16, 2004 in US Patent Publication No. 2003/0128179, (U.S. Appl. No. 10/278,352).
Clairvoyante Inc, Response to Non-Final Office Action, dated Apr. 15, 2005 in US Patent Publication No. 2003/0128179, (U.S. Appl. No. 10/278,352).
USPTO, Non-Final Office Action, dated Jul. 12, 2005 in US Patent Publication No. 2003/0128179, (U.S. Appl. No. 10/278,352).
Clairvoyante Inc, Response to Non-Final Office Action, dated Jan. 12, 2006 in US Patent Publication No. 2003/0128179, (U.S. Appl. No. 10/278,352).
USPTO, Non-Final Office Action, dated Sep. 14, 2005 in US Patent Publication No. 2004/0080479 (U.S. Appl. No. 10/347,001).
Clairvoyante Inc, Response to Non-Final Office Action, dated Mar. 8, 2006 in US Patent Publication No. 2004/0080479 (U.S. Appl. No. 10/347,001).
USPTO, Final Office Action, dated May 15, 2006 in US Patent Publication No. 2004/0080479 (U.S. Appl. No. 10/347,001).
Clairvoyante Inc, Response to Final Office Action, dated Aug. 15, 2006 in US Patent Publication No. 2004/0080479 (U.S. Appl. No. 10/347,001).
USPTO, Non-Final Office Action, dated Oct. 27, 2006 in US Patent Publication No. 2004/0080479 (U.S. Appl. No. 10/347,001).

* cited by examiner

COLOR FLAT PANEL DISPLAY ARRANGEMENTS AND LAYOUTS WITH REDUCED BLUE LUMINANCE WELL VISIBILITY

RELATED APPLICATIONS

This application is a divisional application of, and claims priority to, U.S. patent application Ser. No. 10/278,328, entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY." U.S. patent application Ser. No. 10/278,328 is a continuation-in-part of U.S. patent application Ser. No. 10/024,326 entitled "IMPROVEMENTS TO COLOR FLAT PANEL DISPLAY SUB-PIXEL ARRANGEMENTS AND LAYOUTS," filed on Dec. 14, 2001, and issued as U.S. Pat. No. 6,950,115 ("the '115 patent") which is hereby incorporated by reference herein. U.S. patent application Ser. No. 10/278,328 is published as US Patent Application Publication No. 2003/0117423, which is also hereby incorporated by reference herein.

This application is also related to U.S. patent application Ser. No. 10/278,393, entitled "COLOR DISPLAY HAVING HORIZONTAL SUB-PIXEL ARRANGEMENTS AND LAYOUTS," filed on Oct. 22, 2002 and published as US Patent Application No. 2003/0090581 ("the '581 application"); U.S. patent application Ser. No. 10/278,353, entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed on Oct. 22, 2002 and published as US Patent Application No. 2003/0128225 ("the '225 application"); and U.S. patent application Ser. No. 10/278,352, entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUBPIXELS," filed on Oct. 22, 2002 and published as US Patent Application No. 2003/0128179 ("the '179 application"), which are hereby incorporated herein by reference and commonly owned by the same assignee of this application.

BACKGROUND

The present application relates to improvements to display layouts, and, more particularly, to improved color pixel arrangements and means of addressing used in displays.

The present state of the art of color single plane imaging matrix, for flat panel displays use the red-green-blue (RGB) color triad or a single color in a vertical stripe (i.e. "RGB stripe") as shown in prior art FIG. 1. FIG. 1 shows a prior art arrangement 10 having several three-color pixel elements with red emitters (or sub-pixels) 14, blue emitters 16, and green emitters 12. The arrangement takes advantage of the Von Bezold effect by separating the three colors and placing equal spatial frequency weight on each color. However, this panel suffers because of inadequate attention to how human vision operates. These types of panels are a poor match to human vision.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chromanance, and motion. Motion is only important for flicker threshold to the imaging system designer. The luminance channel takes the input from only the red and green receptors. In other words, the luminance channel is "color blind". It processes the information in such a manner that the contrast of edges is enhanced. The chromanance channel does not have edge contrast enhancement. Since the luminance channel uses and enhances every red and green receptor, the resolution of the luminance channel is several times higher than the chromanance channels. Consequently, the blue receptor contribution to luminance perception is negligible. The luminance channel thus acts as a resolution band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the diagonal axes is significantly lower.

The chromanance channel is further subdivided into two sub-channels, to allow us to see full color. These channels are quite different from the luminance channel, acting as low pass filters. One can always tell what color an object is, no matter how big it is in our field of view. The red/green chromanance sub-channel resolution limit is at 8 cycles/°, while the yellow/blue chromanance sub-channel resolution limit is at 4 cycles/°. Thus, the error introduced by lowering the blue resolution by one octave will be barely noticeable by the most perceptive viewer, if at all, as experiments at Xerox and NASA, Ames Research Center (see, e.g., R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.25° subtends 50 mils (1,270μ) on a display. Thus, if the blue pixel pitch is less than half (625μ) of this blending pitch, the colors will blend without loss of picture quality. This blending effect is directly related to the chromanance sub-channel resolution limits described above. Below the resolution limit, one sees separate colors, above the resolution limit, one sees the combined color.

Examining the conventional RGB stripe display in prior art FIG. 1, the design assumes that all three colors have the same resolution. The design also assumes that the luminance information and the chromanance information have the same spatial resolution. Further, keeping in mind that the blue subpixel is not perceived by the human luminance channel and is therefore seen as a black dot, and since the blue sub-pixel is aligned in stripes, the human viewer sees vertical black lines on the screen as shown in FIG. 2. If the image displayed has large areas of white space, such as when displaying black text on a white background, these dark blue stripes are viewed as a distracting screen artifact. Typical higher resolution prior art displays have pixel densities of 90 pixels per inch. At an average viewing distance of 18 inches, this represents approximately 28 pixels per degree or approximately 14 cycles/°, when showing lines and spaces at the highest Modulation Transfer Function (MTF) allowed by the display. However, what the luminance channel sees is an approximately 28 cycles/° signal horizontally across a white image when considering that the blue sub-pixel 12 is dark compared to the red 14 and green 16 emitters, as shown in prior art FIG. 2. This 28 cycles/° artifact is closer to the peak luminance channel response spatial frequency, 35 cycles/°, than the desired image signal, 14 cycles/°, thus competing for the viewer's attention.

Thus, the above prior art arrangement of three-color emitters is a poor match for human vision.

BRIEF DESCRIPTION OF THE DRAWINGS

The accompanying drawings, which are incorporated in, and constitute a part of this specification illustrate various implementations and embodiments of the invention and, together with the description, server to explain principles of the invention.

DETAILED DESCRIPTION

Reference will now be made in detail to various implementations and embodiments, examples of which are illustrated in the accompanying drawings. Wherever possible, the same reference numbers will be used throughout the drawings to refer to the same or like parts.

Figure 3:
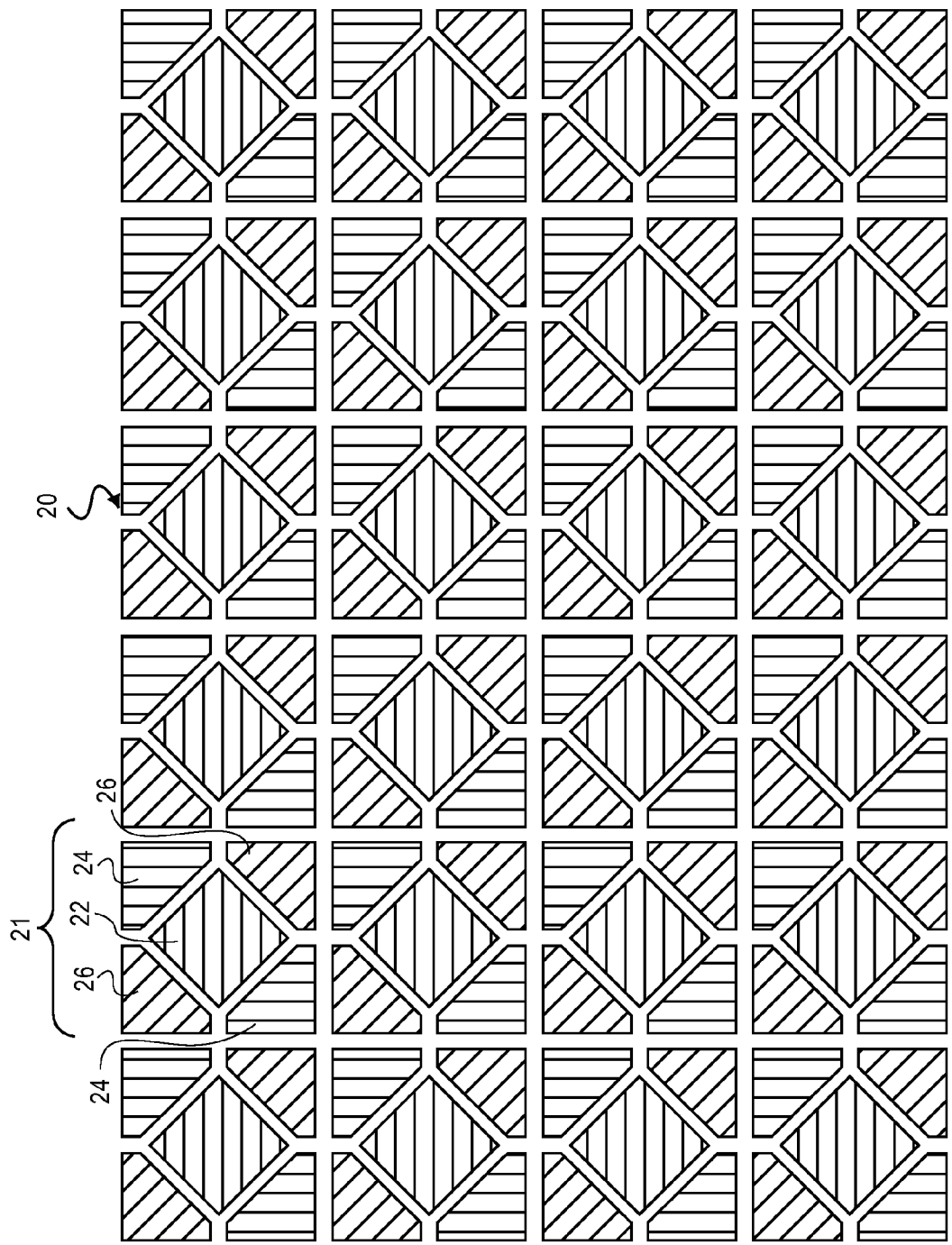
FIG. 3 illustrates an arrangement of three-color pixel elements in an array for a display device.

FIG. 3 illustrates an arrangement 20 of several three-color pixel elements according to one embodiment. Arrangement 20 is also described in the '115 patent referenced above, as well as in co-pending and commonly assigned U.S. patent application Ser. No. 09/916,232 entitled "ARRANGEMENT OF COLOR PIXELS FOR FULL COLOR IMAGING DEVICES WITH SIMPLIFIED ADDRESSING", filed on Jul. 25, 2001, and issued as U.S. Pat. No. 6,903,754 ("the '754 patent"). U.S. Pat. No. 6,903,754 is commonly owned by the same assignee of this application and is hereby incorporated herein by reference. A three-color pixel element 21 consists of a blue emitter (or sub-pixel) 22, two red emitters 24, and two green emitters 26 in a square, which is described as follows. The three-color pixel element 21 is square shaped and is centered at the origin of an X, Y coordinate system. The blue emitter 22 is centered at the origin of the square and extends into the first, second, third, and fourth quadrants of the X, Y coordinate system. A pair of red emitters 24 is disposed in opposing quadrants (i.e., the second and the fourth quadrants), and a pair of green emitters 26 is disposed in opposing quadrants (i.e., the first and the third quadrants), occupying the portions of the quadrants not occupied by the blue emitter 22. The pair of red emitters 24 and green emitters 26 can also be disposed in the first and third quadrants and the second and fourth quadrants, respectively. As shown in FIG. 3, the blue emitter 22 can be square-shaped; having corners aligned at the X and Y axes of the coordinate system, and the opposing pairs of red 24 and green 26 emitters can be generally square shaped (or triangular shaped), having truncated inwardly-facing corners forming edges parallel to the sides of the blue emitter 22.

The array is repeated across a panel to complete a device with a desired matrix resolution. The repeating three-color pixels form a "checker board" of alternating red 24 and green 26 emitters with blue emitters 22 distributed evenly across the device. However, in such an arrangement, the blue emitters 22 are at half the resolution of the red 24 and green 26 emitters.

One advantage of such a three-color pixel element array is improved resolution of color displays. This occurs since only the red and green emitters contribute significantly to the perception of high resolution in the luminance channel. Thus, reducing the number of blue emitters and replacing some with red and green emitters improves resolution by more closely matching human vision.

Dividing the red and green emitters in half in the vertical axis to increase spatial addressability is an improvement over the conventional vertical single color stripe of the prior art. As was disclosed in the '754 patent, an alternating "checkerboard" of red and green emitters allows the Modulation Transfer Function (MTF), i.e. high spatial frequency resolution, to increase in both the horizontal and the vertical axes by using sub-pixel rendering techniques such as those described in co-pending and commonly assigned U.S. patent application Ser. No. 10/150,355, entitled "METHODS AND SYSTEMS FOR SUB-PIXEL RENDERING WITH GAMMA ADJUSTMENT," filed on May 17, 2002, and published as US Patent Application No. 2003/0103058 ("the '058 application"). US Patent Application No. 2003/0103058 is hereby incorporated herein by reference. A further advantage of this arrangement over the prior art arrangement is the shape and location of the blue emitter.

Figure 1:
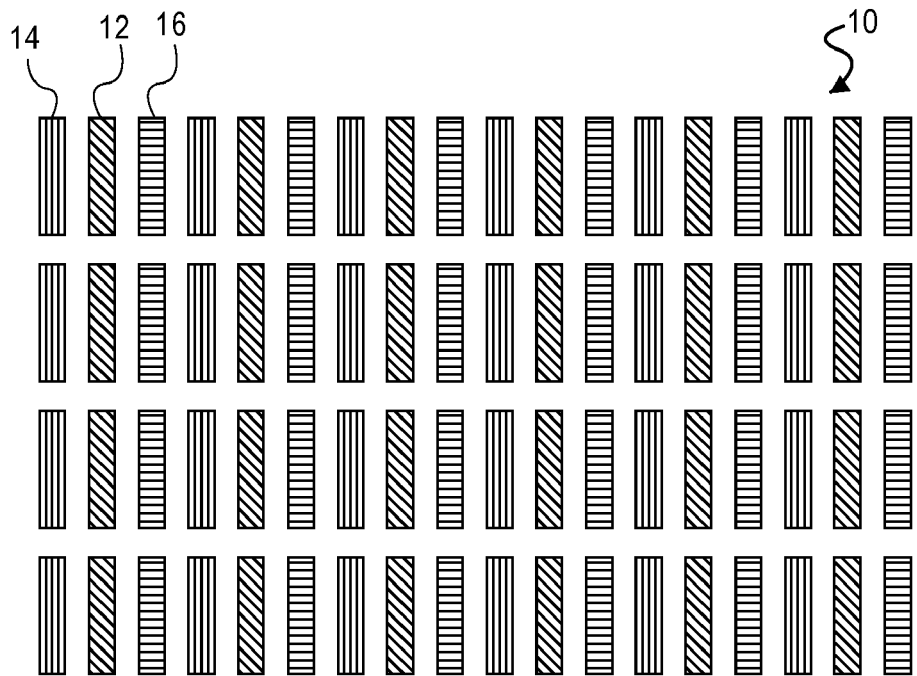
FIG. 1 illustrates a prior art RGB stripe arrangement of three-color pixel elements in an array for a display device.
Figure 2:
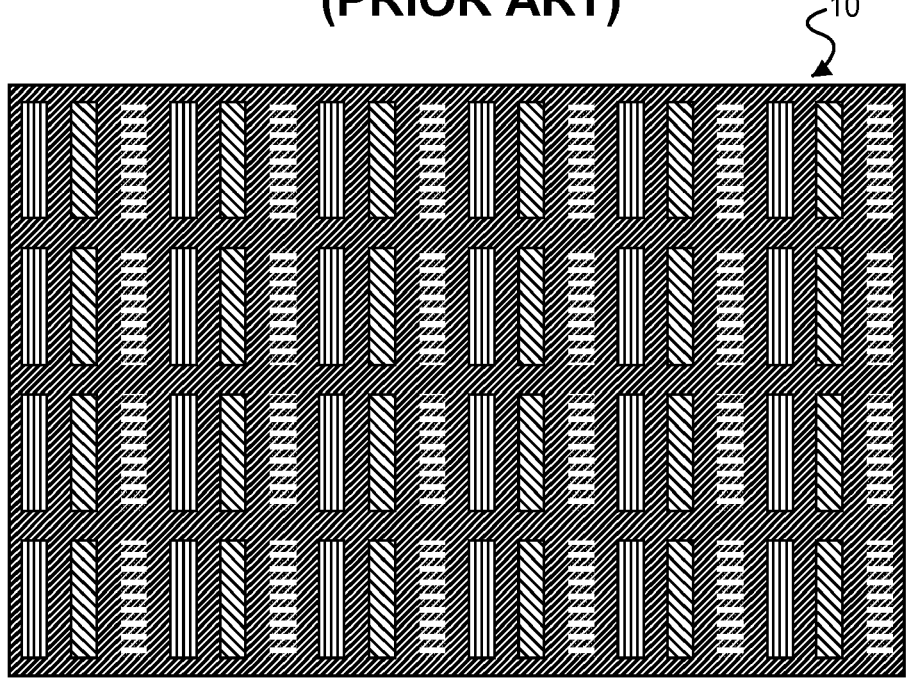
FIG. 2 illustrates a prior art RGB stripe arrangement as it would be perceived by the luminance channel of the human vision system when a full white image is displayed.
Figure 4:
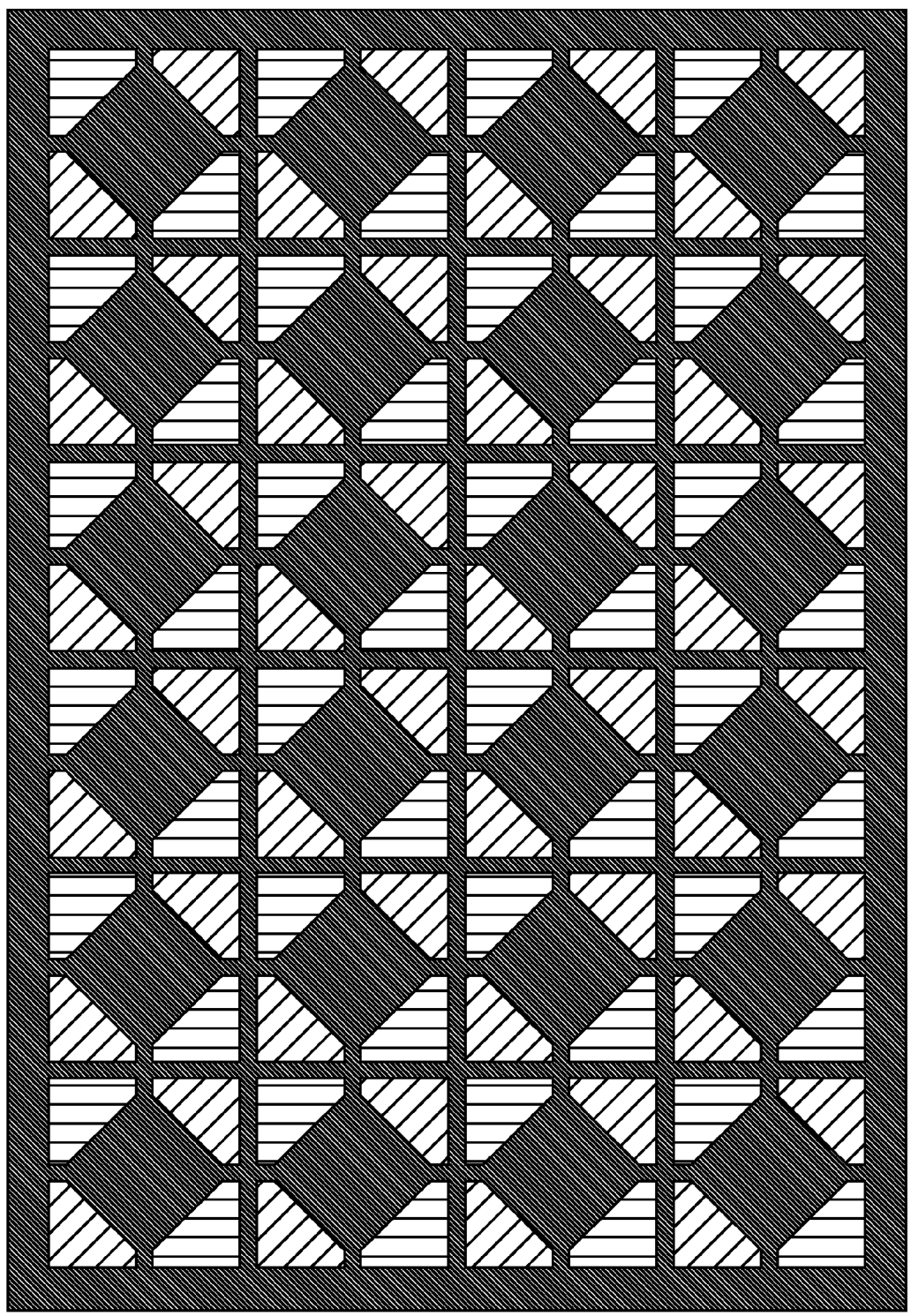
FIG. 4 illustrates the arrangement of FIG. 3, as the luminance channel of the human vision system would perceive it when a full white image is displayed.

In the prior art arrangement of FIG. 1, the blue emitters are viewed in stripes. That is, when viewed, the luminance channel of the human vision system sees these blue emitters as black stripes alternating with white stripes, as illustrated in prior art FIG. 2. In the horizontal direction, there are faint, but discernable lines between rows of three-color pixel elements, largely due to the presence of the transistors, and/or associated structures, such as capacitors, at each emitter, as is common in the art. However, with the arrangement of FIG. 3, when viewed, the luminance channel of the human vision system sees black dots alternating with white dots as illustrated in FIG. 4. This is an improvement because the spatial frequency, i.e. Fourier Transform wave component, and the energies of these components are now spread into every axis, vertical, diagonal, as well as horizontal, reducing the amplitude of the original horizontal signal, and thus, the visual response (i.e., visibility).

Figure 5:
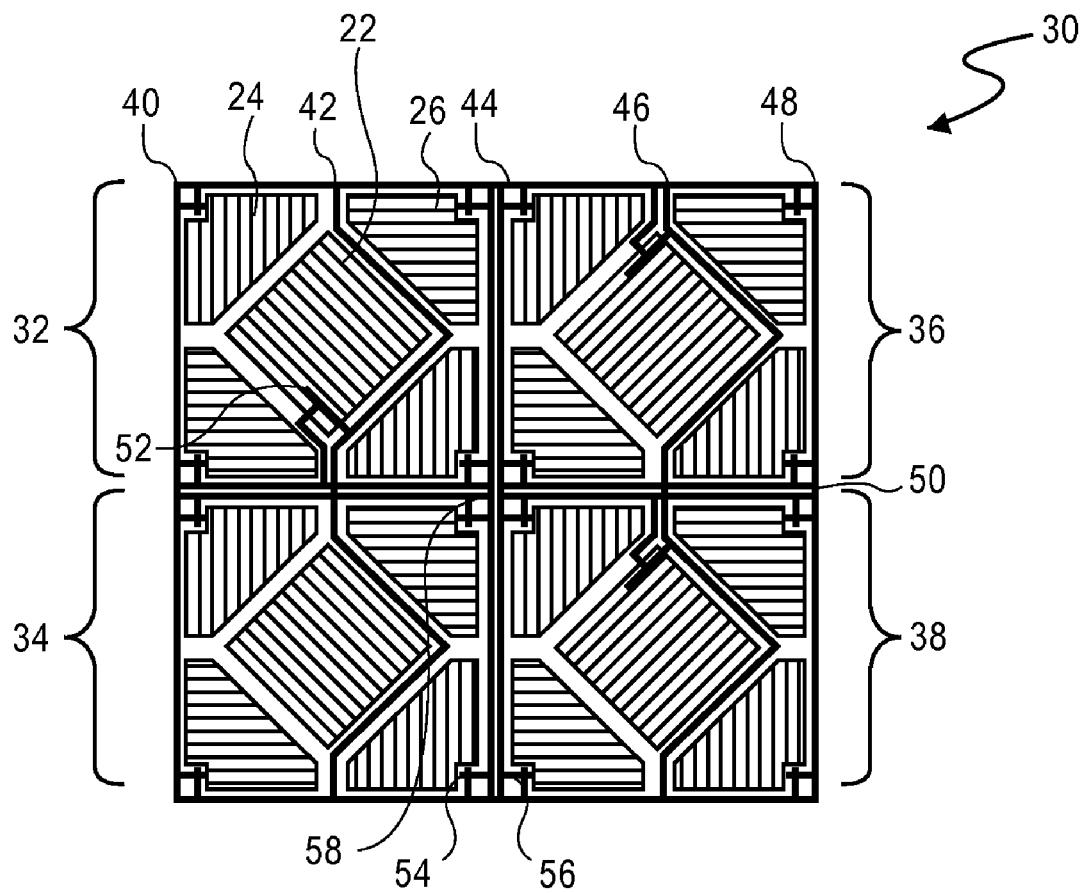
FIG. 5 illustrates a layout of drive lines and transistors for the arrangement of pixel elements of FIG. 4.

FIG. 5 illustrates an embodiment wherein only four three-color pixel elements 32, 34, 36, and 38 are grouped in arrangement 30, while several thousand can be arranged in an array. Column address drive lines 40, 42, 44, 46, and 48 and row address drive line 50 drive each three color pixel element 32, 34, 36, and 38. Each emitter has a transistor, and possibly associated structures such as a capacitor, which may be a sample/hold transistor/capacitor circuit. Therefore, each blue emitter 22 has a transistor 52, each red emitter 24 has a transistor 54, and each green emitter 26 has a transistor 56. Having two column lines 44 and two row lines 50 allows for the transistors, and/or associated structures, for the red emitters and green emitters to be gathered together into the interstitial corners between the three-color pixel elements 32, 34, 36, and 38 creating combined transistor groups 58

Figure 6:
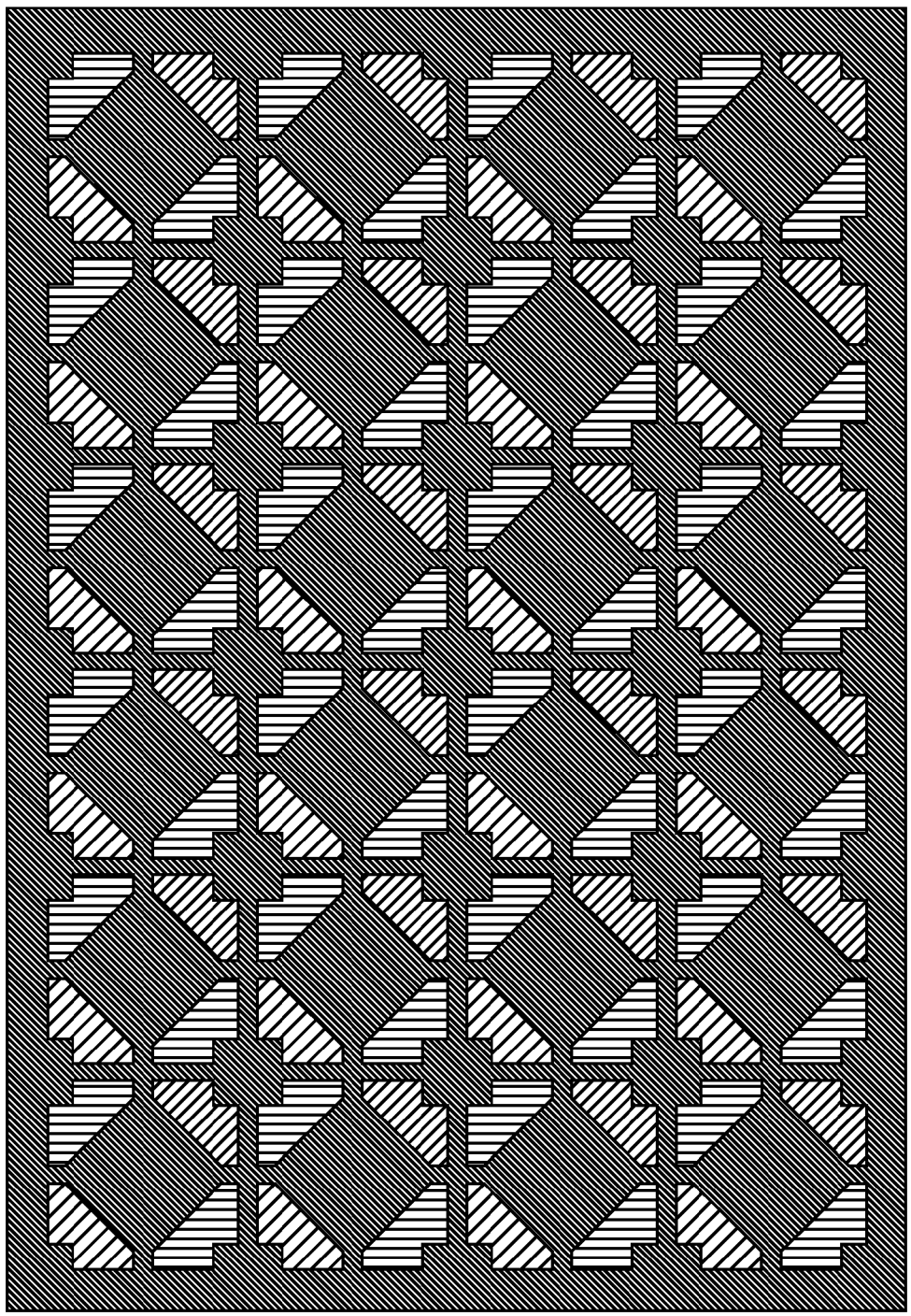
FIG. 6 illustrates the arrangement of FIG. 5, as it would be perceived by the luminance channel of the human vision system, when a full white image is displayed.

The grouping of the transistors and/or associated structures, such as capacitors, in the interstitial corners appears to be counter to good design practice, t, since collecting them together makes them a bigger, and thus more visible dark spot, as shown in FIG. 6. However, in this circumstance these dark spots are exactly halfway between the blue emitter 22 in each three-color pixel element, which provides a beneficial effect as described below.

For instance, in this embodiment, the spatial frequency of the combined transistor groups and/or associated structures, 58 and the blue emitter 22 is doubled, pushing them above the 50 cycles/° resolution limit of the luminance channel of human vision. For example, in a 90 pixel per inch display panel the blue emitter pitch, without the grouped transistors, would create a 28 cycles/° luminance channel signal, both horizontally and vertically. In other words, the blue emitters may be visible as a texture on solid white areas of a display. However, they will not be as visible as the stripes visible in the prior art arrangement.

In contrast to the prior art arrangement of FIG. 1, with the transistors grouped together, the combined group transistors 58 and the blue emitters 22 both become less visible at 56 cycles/°, virtually vanishing from sight almost entirely. In other words, the grouping of the transistors and the blue emitters combine to produce a texture on solid white areas of a display too fine for the human visual system to see. In using this embodiment, the solid white areas become as smooth looking as a sheet of paper.

Figure 7A:
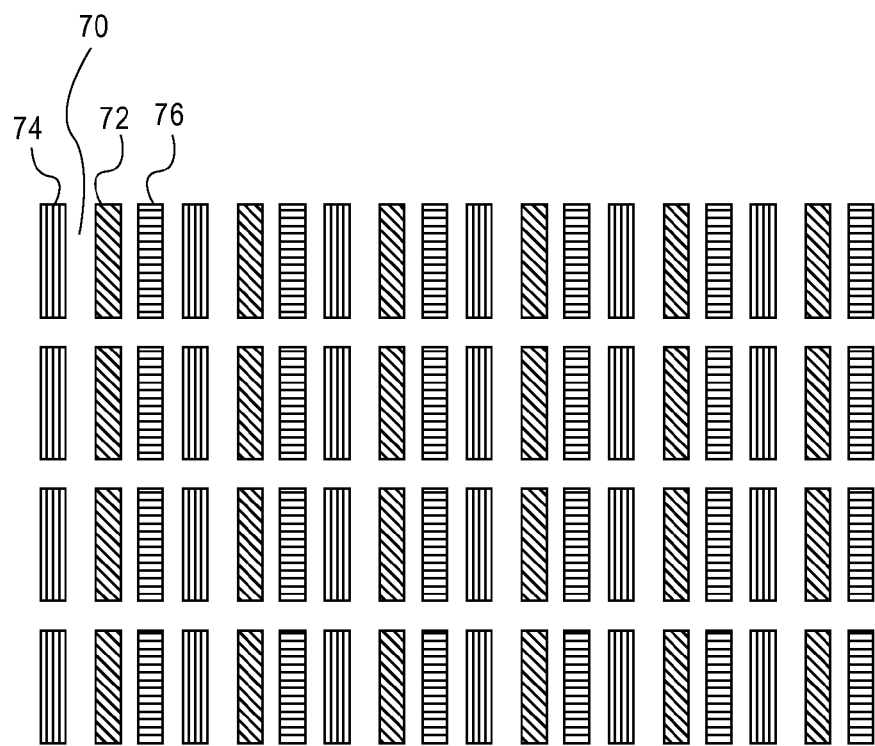
FIG. 7A shows an arrangement similar to that of FIG. 1 with extra space between the red and green stripes.
Figure 7B:
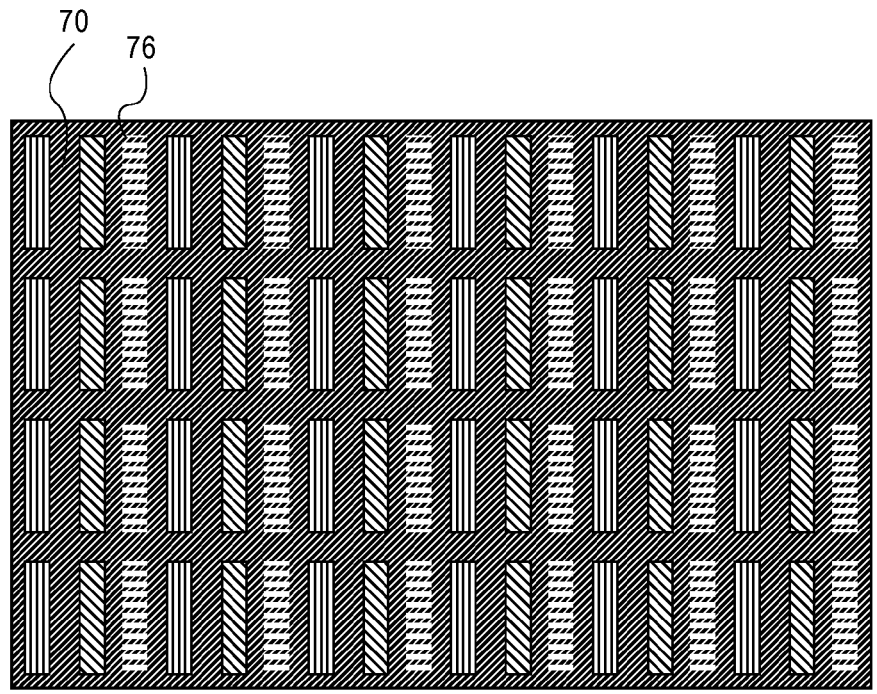
FIG. 7B illustrates the arrangement of FIG. 7A, as it would be perceived by the luminance channel of the human vision system, when a full white image is displayed.

In accordance with another embodiment, FIG. 7A shows an arrangement of three color pixels, three sub-pixels red 74, green 72, and blue 76, repeated in an array to make up an electronic display, similar to that of the prior art arrangement of FIG. 1, except for the extra space 70 that has been inserted between the red 74 and green 72 stripes. The red 74 and green 72 stripes are also interchangeable by interchanging the red 74 and green 72 sub-pixels. As illustrated in FIG. 7B, the luminance channel perceives the blue 76 stripes to be dark stripes that are substantially 180° out of phase with the dark stripes caused by the extra space 70. The extra space 70 creates the same spatial frequency doubling effect as described earlier for the arrangement of FIG. 5. Similarly, the extra space may be disposed where Thin Film Transistors (TFT) and associated storage capacitor elements may be positioned. Additionally, it may be desirable to use 'black matrix' material, known in the art, to fill the extra space.

The techniques disclosed herein can apply to any sub-pixel groupings—repeated on a display—wherein some dark colored sub-pixels substantially form a vertical line down the display. Thus, the disclosed techniques not only contemplate configurations such as traditional RGB striping and its improvements and other configuration such as FIG. 9A; but also any repeat sub-pixel grouping that comprises a dark color sub-pixel stripe on the display. Additionally, the disclosed techniques contemplate that a display comprising any blue or substantially blue or some other dark color in which a vertical stripe would be visible to the eye when fully turned on might benefit from the addition of such a stripe. Additionally, this dark stripe could be used in conjunction with a staggered vertical line—as discussed in connection with FIGS. 13A, 13B, 14A and 14B—and in conjunction with any other configuration wherein dark colored sub-pixels occur in a possible staggered and/or scattered arrangement. The spacing should be sufficient in all of these cases such that the human eye would perceive the dark colored sub-pixel stripe to be visibly out of phase with the spacing.

Figure 7C:
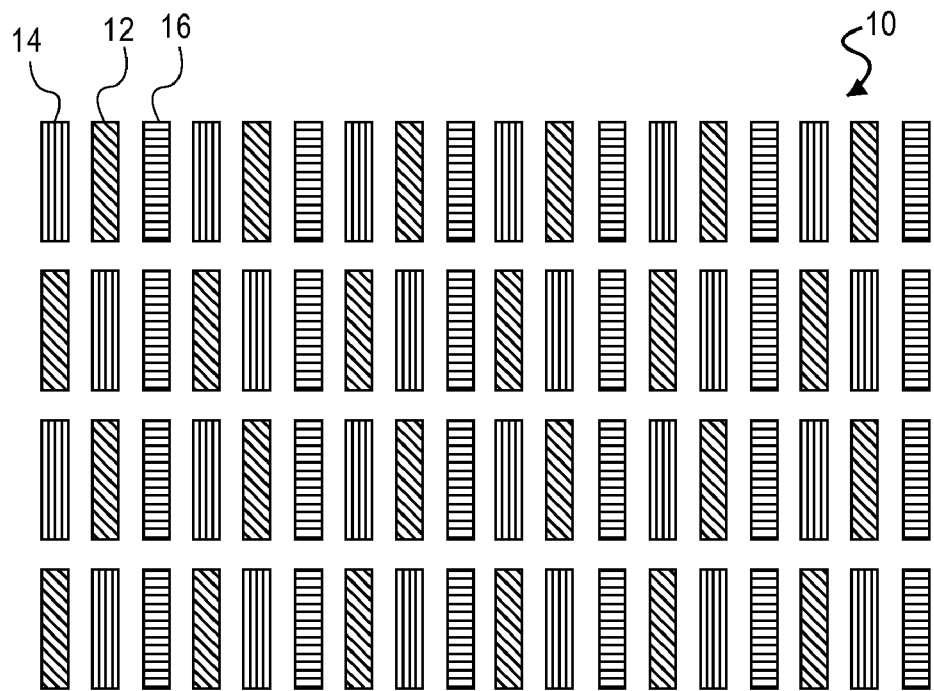
FIG. 7C shows an arrangement similar to that of FIG. 1 with the red and green sub-pixels arrayed on a "checkerboard" pattern.
Figure 7D:
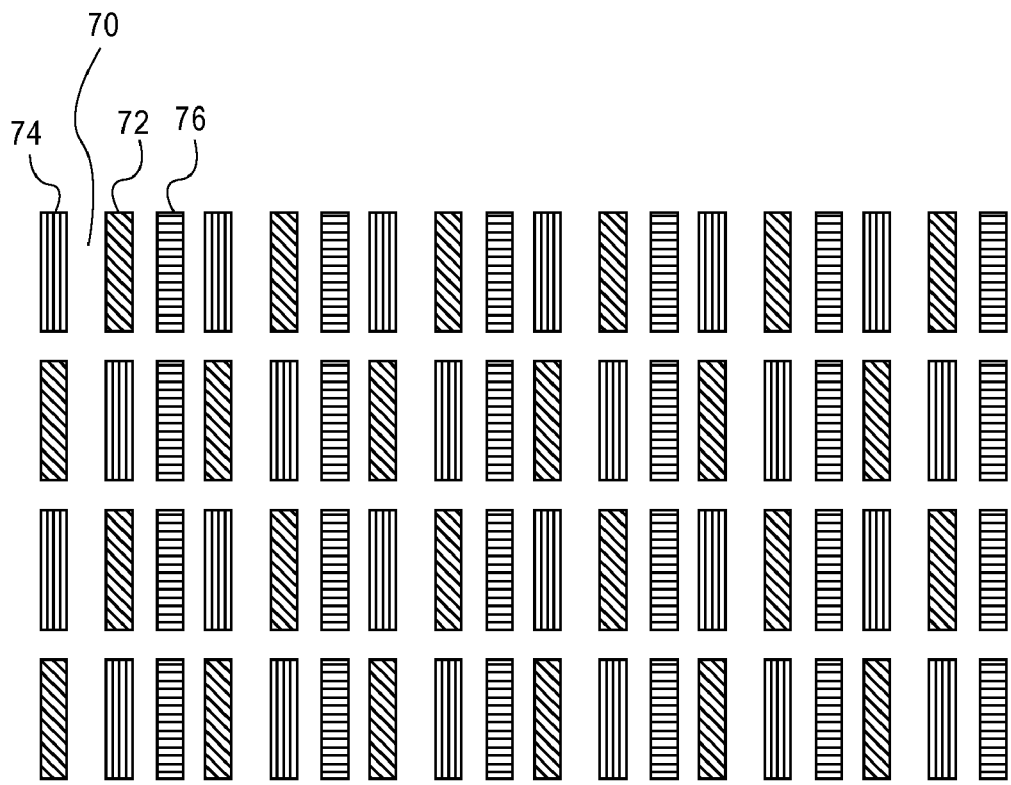
FIG. 7D shows the arrangement of FIG. 7C wherein an additional dark spacing is placed between the two columns having red and the green sub-pixels.

FIG. 7C shows another alternative embodiment wherein the traditional RGB stripe arrangement is altered by changing the color assignments of the red and green sub-pixels on alternating rows—so that the red sub-pixels 74 and green sub-pixels 72 are now on a "checkerboard" pattern. As previously discussed, this checkerboard pattern allows for high spatial frequency to increase in both the horizontal and vertical axes. The installed base of TFT back planes, that conventionally use sub-pixels with a 3:1 aspect ratio, may be used to advantage by redefining the color filter only by swapping the red and green color assignments every other row as shown. The TCON may handle the reordering of the color data to allow for sub-pixel rendering, and sub-pixel rendering may be accomplished in the manner described in the '355 application, or in another suitable manner known in the art. Sub-pixels with a 3:1 (height to width) aspect ratio having a contiguous grouping of a red, green, and a blue sub-pixel within a row may be addressed as a 'whole pixel'. This whole pixel may be at 1:1 aspect ratio. An array of such whole pixels may be addressed using conventional whole pixel addressing means and methods to allow compatibility and equivalent characteristics as prior art RGB stripe displays, but allow superior sub-pixel rendering performance, when addressed so, due to the red and green checkerboard. This is contrasted with the aspect ratio of 3:2 (height to width) shown in FIG. 8A, described in the '232 application. In that case, a grouping of six sub-pixels, three in one row and three in the next, directly below or above, will collectively exhibit a 1:1 aspect ratio FIG. 7D shows the arrangement of FIG. 7C wherein an extra space 70 is inserted between the columns having the red and green sub-pixels only. The luminance channel would then perceive the blue stripes 76 to be dark strips that are substantially 180° out of phase with the dark stripe caused by the extra space 70—similar to that shown in FIG. 7B.

Figure 8A:
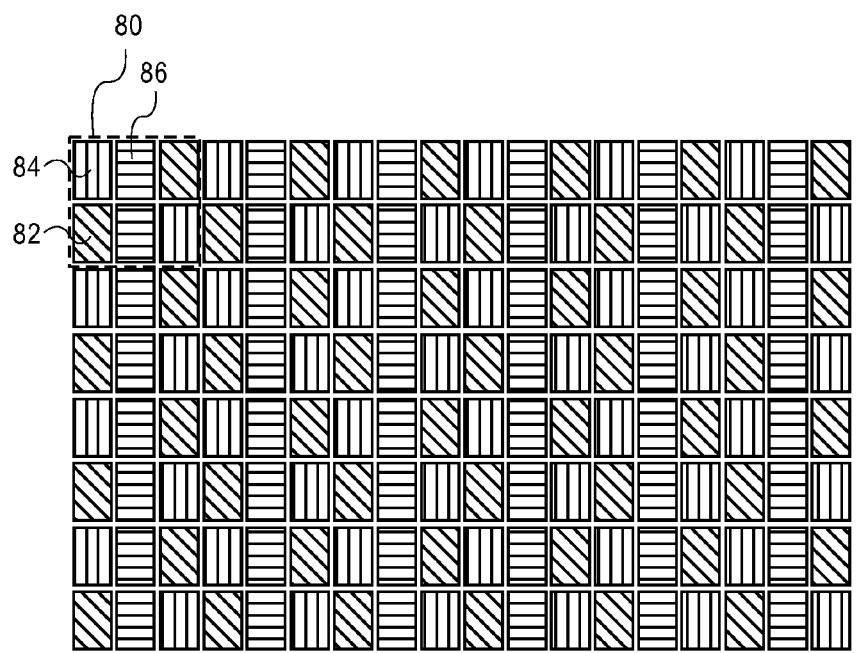
FIG. 8A shows an arrangement of three-color pixel elements in an array for a display device.
Figure 8B:
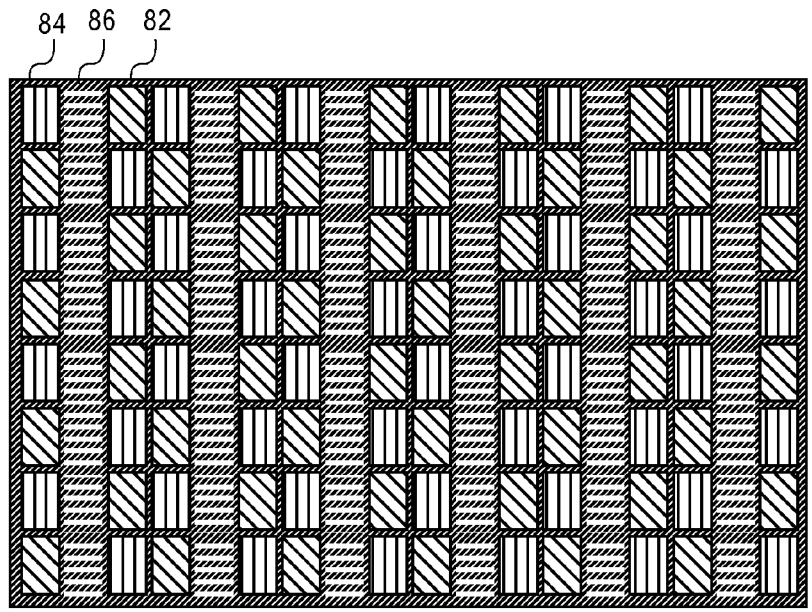
FIG. 8B illustrates the arrangement of FIG. 8A, as it would be perceived by the luminance channel of the human vision system, when a full white image is displayed.

FIG. 8A shows an arrangement 80 of sub-pixels in three colors as was described in the '754 patent. Arrangement 80 has two rows of sub-pixels with blue sub-pixels 86 disposed in the center of each row. Red sub-pixels 84 are disposed to the left of the blue sub-pixel 86 in the first row of sub-pixels, and green sub-pixels 82 are disposed to the left of the blue sub-pixel 86 in the second row of sub-pixels. Green sub-pixels 82 are disposed to the right of the blue sub-pixel 86 in the first row of sub-pixels, and red sub-pixels 84 are disposed to the right of the blue sub-pixel 86 in the second row of sub-pixels. FIG. 8B illustrates how the arrangement 80 of FIG. 8A would be perceived by the luminance channel of the human vision system when a full white image is displayed. Note that the blue 86 sub-pixels form dark stripes against the white background. In this case, since sub-pixel rendering on the red 84 and green 82 checkerboard can show images at the same spatial frequency as the dark blue 86 stripes, the 'noise' of the dark blue 86 stripes creates a masking signal that interferes with the desired sub-pixel rendered image.

Figure 8C:
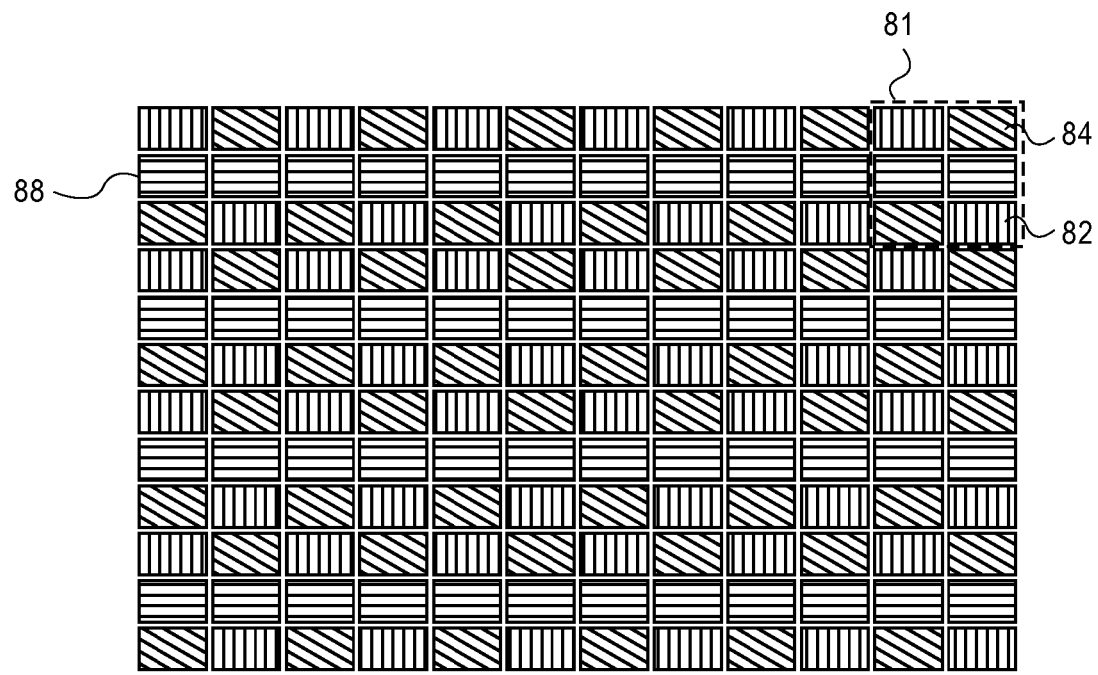
FIG. 8C shows an arrangement of three-color pixel elements in an array, in a single plane, for a display device, similar to the arrangement of FIG. 8A, but the elements are rotated 90°.
Figure 8D:
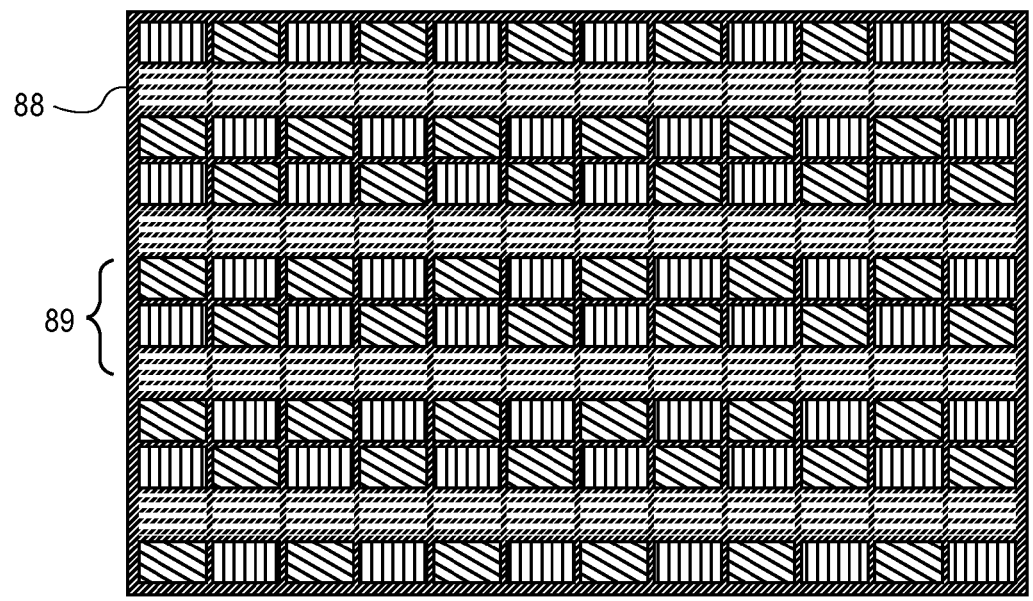
FIG. 8D illustrates the arrangement of FIG. 8C, as it would be perceived by the luminance channel of the human vision system, when a full white image is displayed.

Since the human vision system has slighter higher sensitivity to contrast modulation in the horizontal direction, rotating the dark blue stripes as shown in FIGS. 8C and 8D may reduce the visibility. Further, since the dark blue stripes 88 and white stripes 89 are in the same plane as the binocular placement of eyes in the human face, the horizontal stripes do not induce a signal in the stereoopsis, depth perception, pathways in the brain, reducing their visibility. A further reduction may be caused by long exposure to horizontal stripes in raster scanned CRTs such as commercial television units creating a well practiced perceptual filter in the human vision system. That is to say, those viewers long accustomed to viewing electronic displays with horizontal stripes simply learn to ignore them. The horizontal arrangement 81 for the sub-pixel layout 80 of FIG. 8A is shown in FIGS. 8C and 8D. Each sub-pixel is formed on the display with its length-wise side on the horizontal axis. This arrangement is described in copending and commonly assigned U.S. patent application Ser. No. 10/278,393, entitled "COLOR DISPLAY HAVING HORIZONTAL SUB-PIXEL ARRANGEMENTS AND LAYOUTS," filed on Oct. 22, 2002 and published as US Patent Application No. 2003/0090581 ("the '581 application").

It should be appreciated that more than one of the disclosed techniques can be used simultaneously for additive benefit. For example, stripes 88 and 89 of FIG. 8C may be combined with the extra space 90 described and shown in FIG. 9A, with the transistors and associated storage capacitors creating the space, which in turn may be combined with the optimally positioned optical vias described and shown in FIG. 12A, also perhaps with a narrower, but higher luminance, blue sub-pixel.

Figure 9A:
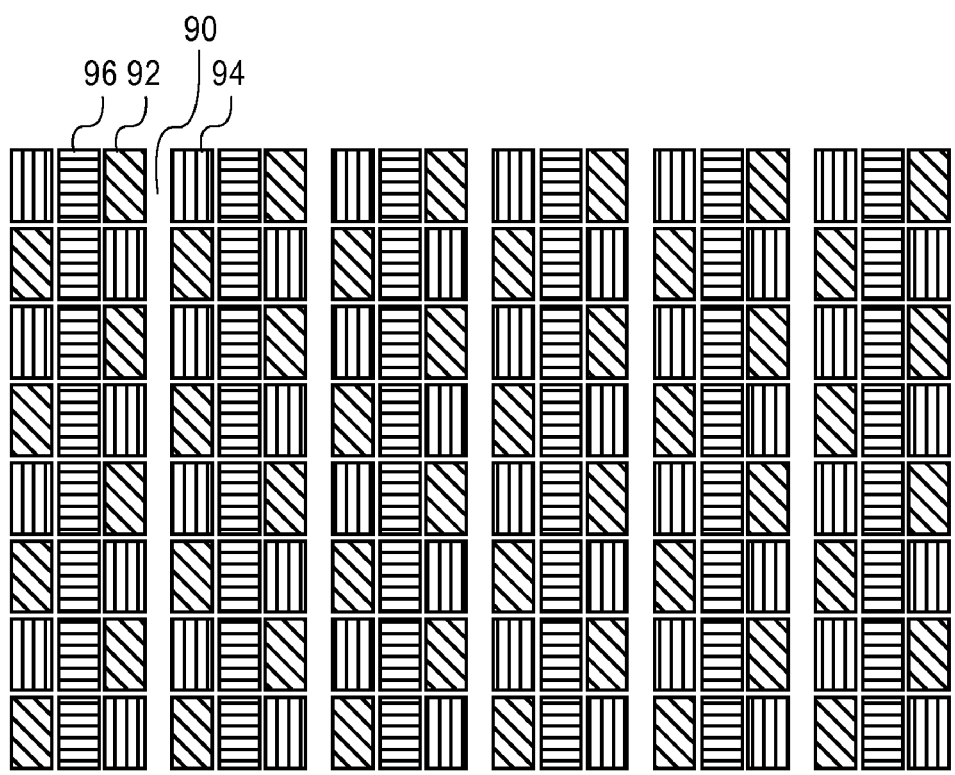
FIG. 9A shows an arrangement similar to that of FIG. 8A with extra space between the red and green stripes.
Figure 9B:
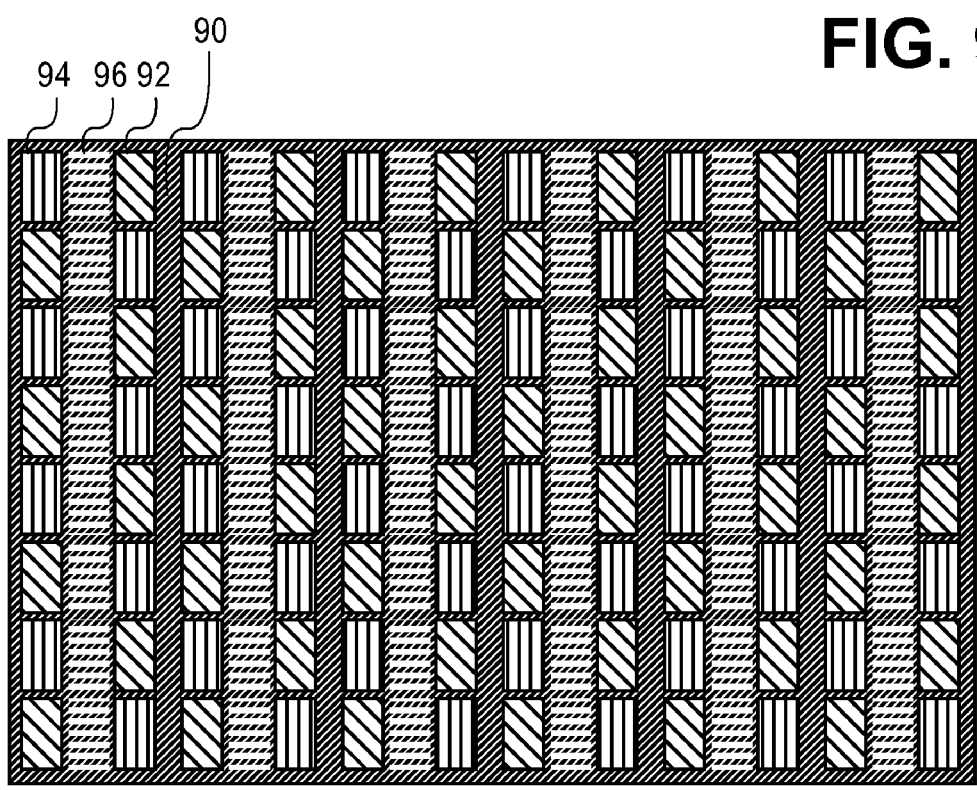
FIG. 9B illustrates the arrangement of FIG. 9A, as it would be perceived by the luminance channel of the human vision system, when a full white image is displayed.

In accordance with another embodiment, FIG. 9A shows an arrangement similar to that of FIG. 8A, save that extra space 90 is inserted between the columns comprised of red sub-pixels 94 and green sub-pixels 92. As illustrated in FIG. 9B, the luminance channel perceives the columns of blue sub-pixels 96 to be dark stripes that are substantially 180° out of phase with the dark stripes caused by the extra space 90. The extra space 90 creates the same spatial frequency doubling effect as described earlier for the arrangement of FIG. 7A. Similarly, the extra space may be where Thin Film Transistors (TFT) and associated storage capacitor elements may be positioned. Additionally, it may be desirable to use 'black matrix' material, known in the art, to fill the extra space.

In FIGS. 7A, 7D and 9A, the extra space width is calculated to compensate and double the effective spatial frequency of the blue stripe luminance well. While a first order analysis of the blue stripe is to assume that it has zero luminance because the blue receptors of the eye does not connect to the luminance channel of the human vision system, real embodiments of flat panel displays may not have ideal blue emitters, instead they may be emitting light that is perceived in part by the green receptors which do feed the luminance channel. Thus, a careful analysis of real embodiments of flat panel displays takes into account the slight, but measurable, luminance of the substantially blue emitters. The more luminance the blue emitter has, the narrower the extra space is designed. Also, the more radiance the blue emitter has, the narrower the blue emitter may be and still have the same white balance on the display. This in turn leads to a narrower extra space required to balance the blue stripe. Thus, it may be advantageous to use a backlight and/or blue emitter that has more deep blue emission to allow a narrower blue sub-pixel, and more blue-green emission to increase the luminance and thus allow an even narrower extra space. Calculating the optimum dimensions of the extra space can be accomplished by using a one dimensional model of the display, with each color emitters luminance, applying a Fourier Transform, noting the signal strength of the dark/light variations, adjusting the widths of the extra space vs. the emitters, until the signal strength is minimized.

Figure 10A:
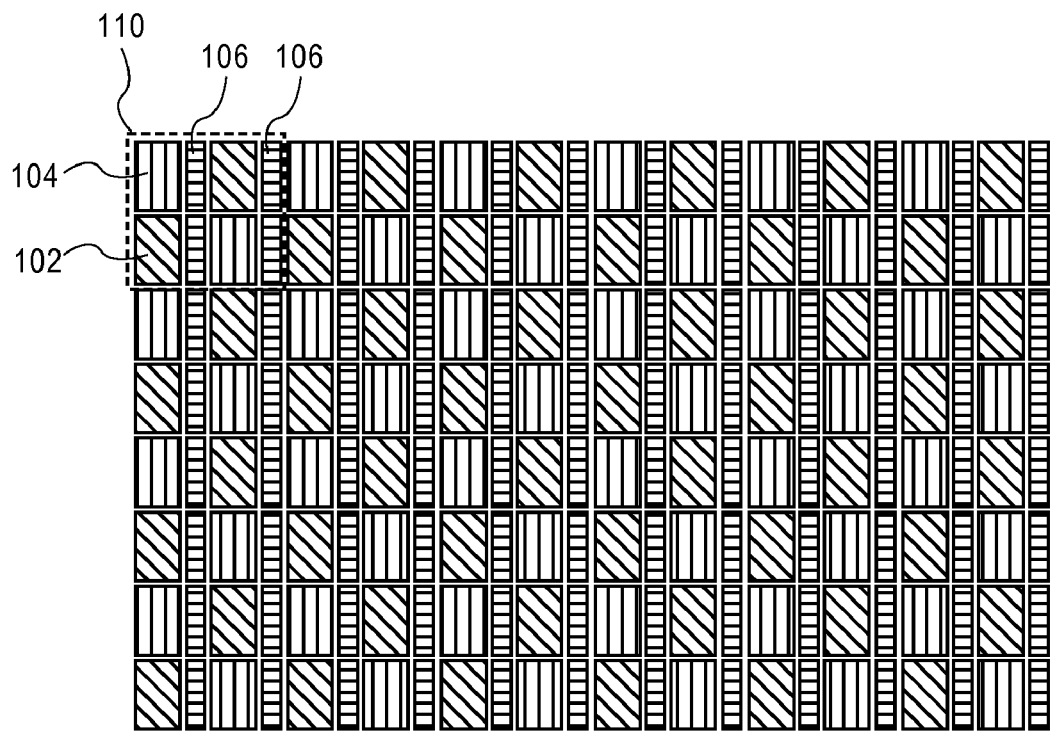
FIG. 10A shows an arrangement of three-color pixel elements in an array, in a single plane, for a display device.
Figure 11A:
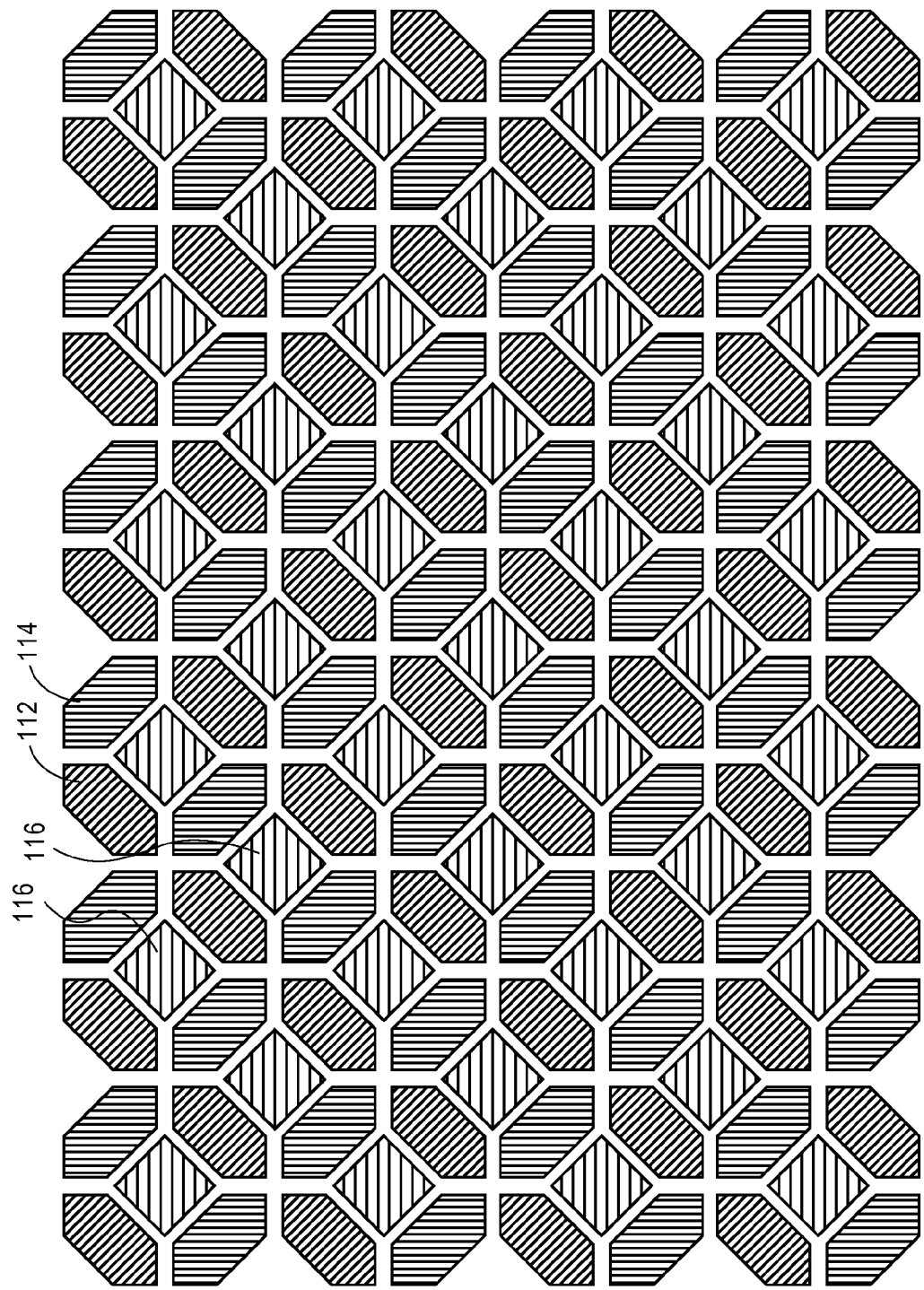
FIG. 11A shows an arrangement of three-color pixel elements in an array, in a single plane, for a display device.
Figure 11B:
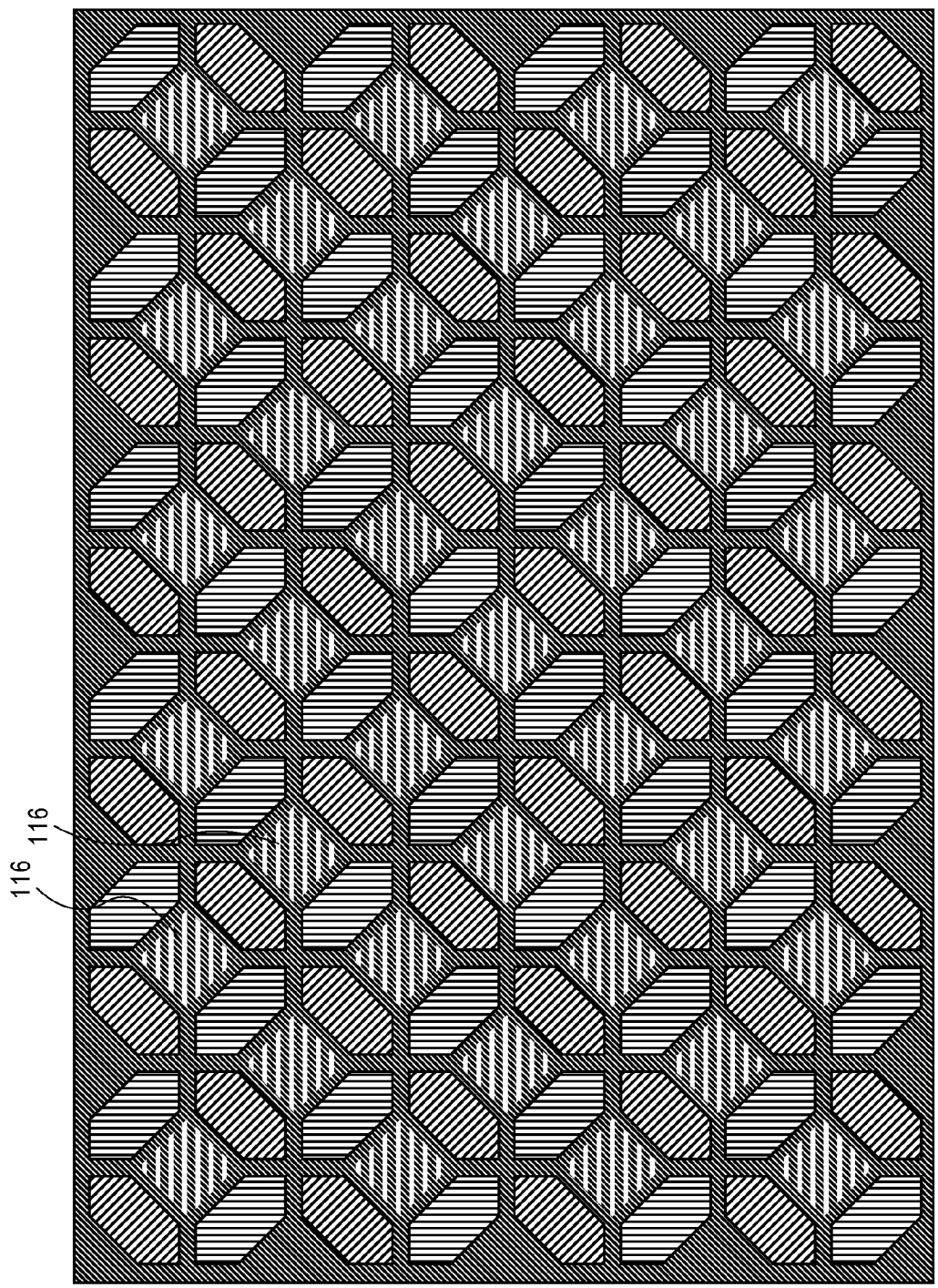
FIG. 11B illustrates the arrangement of FIG. 11A, as it would be perceived by the luminance channel of the human vision system, when a full white image is displayed.

According to another embodiment, instead of creating a black feature on the display panel, it is possible to split the blue sub-pixel to increase the spatial frequency. It may also be desirable to place the split blue sub-pixels evenly across the panel. FIGS. 10A and 11A show such a modification to the arrangements of FIGS. 8A and 3, respectively.

Figure 10B:
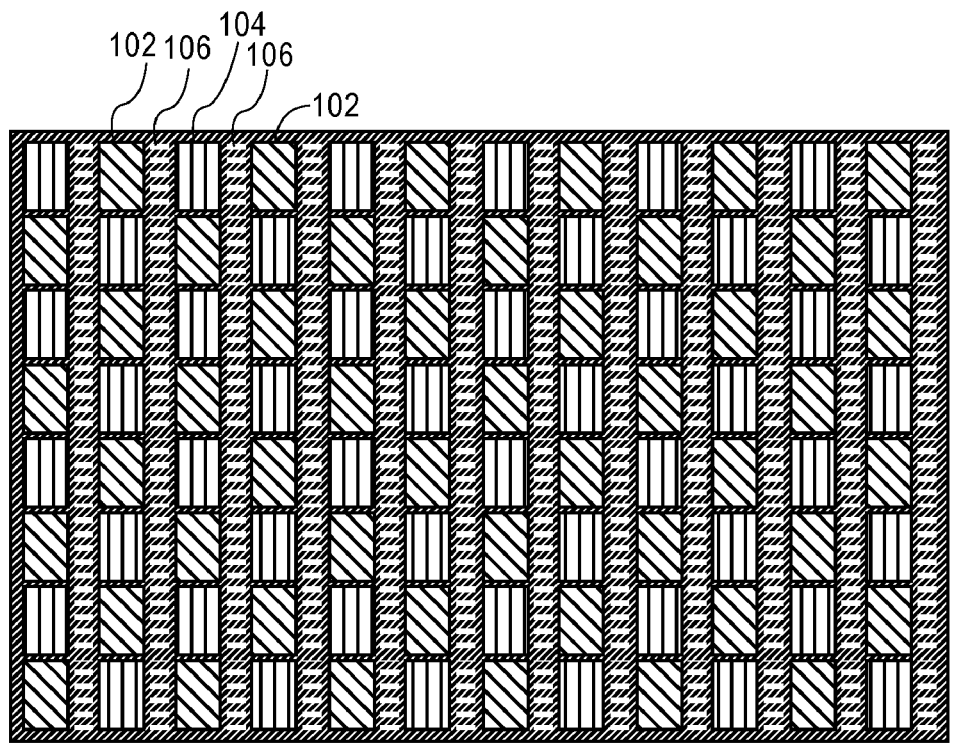
FIG. 10B illustrates the arrangement of FIG. 10A, as it would be perceived by the luminance channel of the human vision system, when a full white image is displayed.

FIG. 10A shows the column of blue sub-pixels of the arrangement 80 of FIG. 8A split into two columns 106 of blue sub-pixels, each half the width along a horizontal axis of the red and green stripes, and placed between each column of alternating red sub-pixels 104 and green 102 sub-pixels. As illustrated in FIG. 10B, the luminance channel perceives the columns 106 of blue sub-pixels to be dark stripes that are substantially 180° out of phase with each other. The presence of columns 106 creates the same spatial frequency doubling effect as described earlier for the arrangement of FIG. 9A.

FIG. 11A shows the blue sub-pixel dots split into two sub-pixel dots, each half the area of the red and green sub-pixels, and placed between each column and row of red 114 and green 112 alternating sub-pixels. As illustrated in FIG. 10B, the luminance channel perceives the blue 116 dots to be dark dots that are substantially 180° out of phase with each other. The extra split blue 116 dots create the same spatial frequency doubling effect as described earlier for the arrangement of FIG. 6.

Figure 12A:
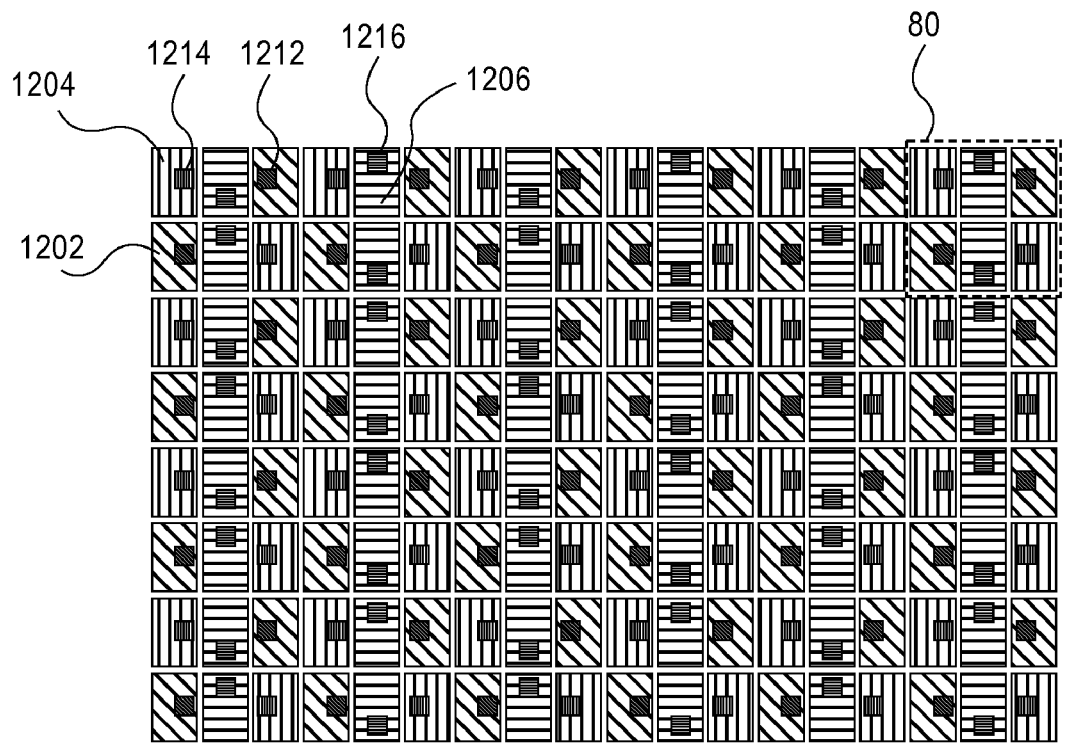
FIG. 12A shows an arrangement of three-color pixel elements in an array, in a single plane, for a display device, designed for transflective operation.
Figure 12B:
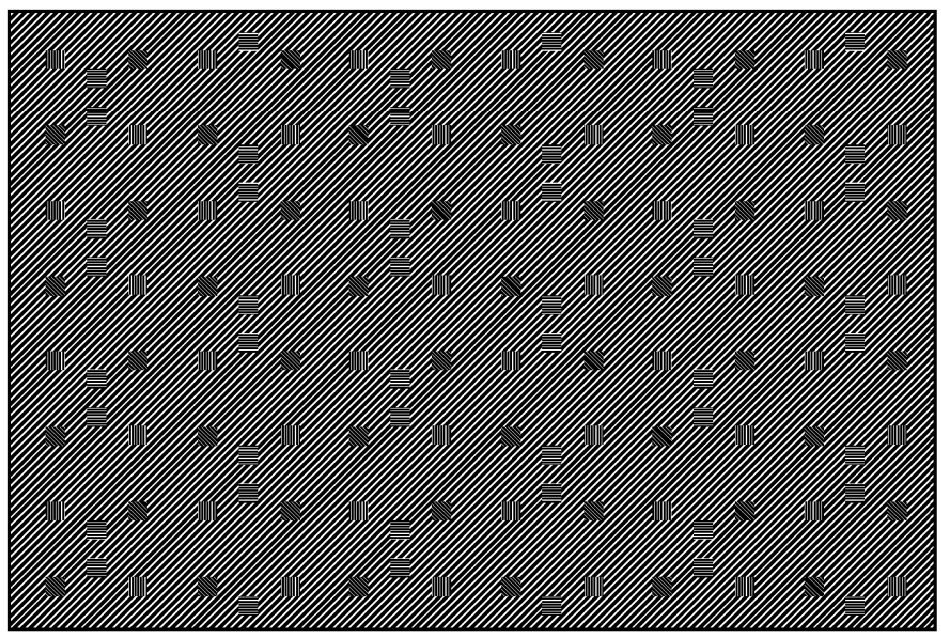
FIG. 12B illustrates the arrangement of FIG. 12A, as it would be perceived by the luminance channel of the human vision system, when a full white image is displayed, using a backlight to illuminate the screen under low ambient light conditions.

It should be noted that the above embodiments have the additional benefit of moving the red and green sub-pixels closer to being on a regular, evenly spaced, checkerboard. This improves sub-pixel rendering performance. In accordance with this aspect, FIGS. 12A and 12B show an embodiment for a transflective display that place optical vias 1212, 1214, and 1216 in positions that increase sub-pixel rendering performance and decrease the blue stripe visibility. FIG. 12A uses a similar arrangement of red 1204, green 1202, and blue 1206 sub-pixels as that of FIG. 8A. These sub-pixels reflect ambient light toward the viewer, modulated by the display device incorporated therein. Such a device may be Liquid Crystal or Iridescent in operation, or other suitable technology. During high ambient light conditions, such a display may be perceived by the luminance channel of the human vision system as shown in FIG. 8B. However, during low ambient light conditions, a backlight may illuminate the display, primarily through the red 1214, green 1212, and blue 1216 optical vias. A similar use of optical vias could also be used on the altered RGB stripe display shown in FIG. 7C to similar effect for purposes of the present invention.

FIG. 12B illustrates how the arrangement of FIG. 12A would be perceived by the luminance channel of the human vision system when a full white image is displayed under low ambient light conditions. Note that the red 1214 and green 1212 optical vias are arranged such that they approach being a regular, evenly spaced, checkerboard, improving the sub-pixel rendering performance. Also note that the blue 1216 optical vias are placed such that they break up the stripe appearance, in both horizontal and vertical axis, when they are backlit and viewed under low ambient light conditions. The positioning of the blue 1216 optical vias shifts the phases of the blue reconstruction points, reducing their visibility. While FIG. 12B illustrates two positions of the optical vias, it is to be appreciated that the possible positions of the optical vias are not limited in any manner by the figure, and all possible positions are contemplated and encompassed by the present invention.

Figure 13A:
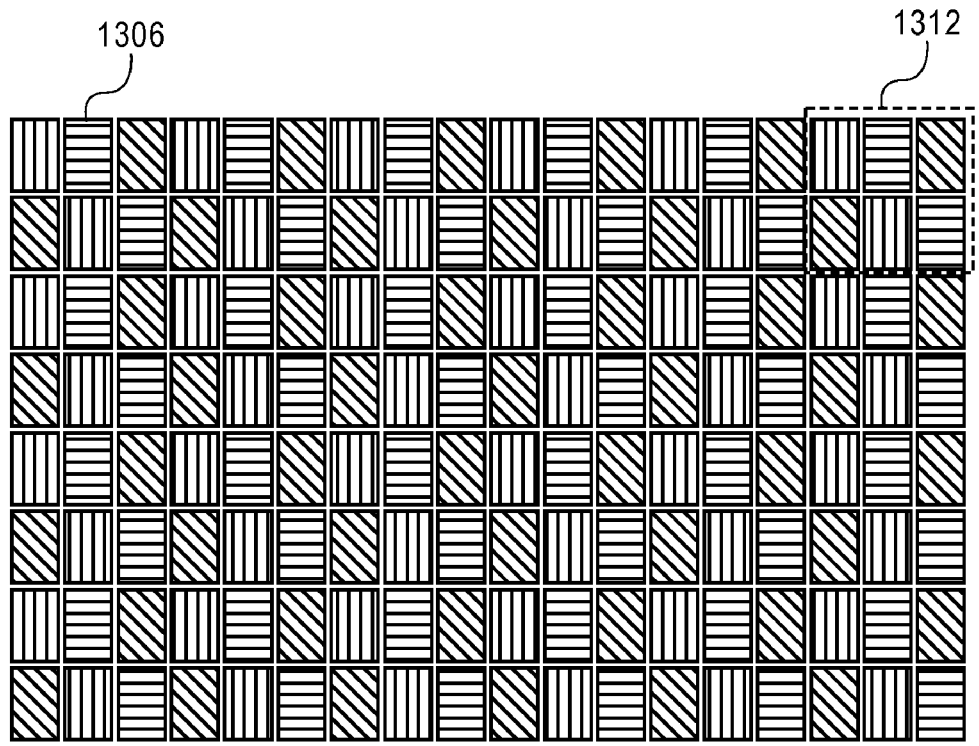
FIG. 13A shows an arrangement of three-color pixel elements in an array, in a single plane, for a display device.
Figure 13B:
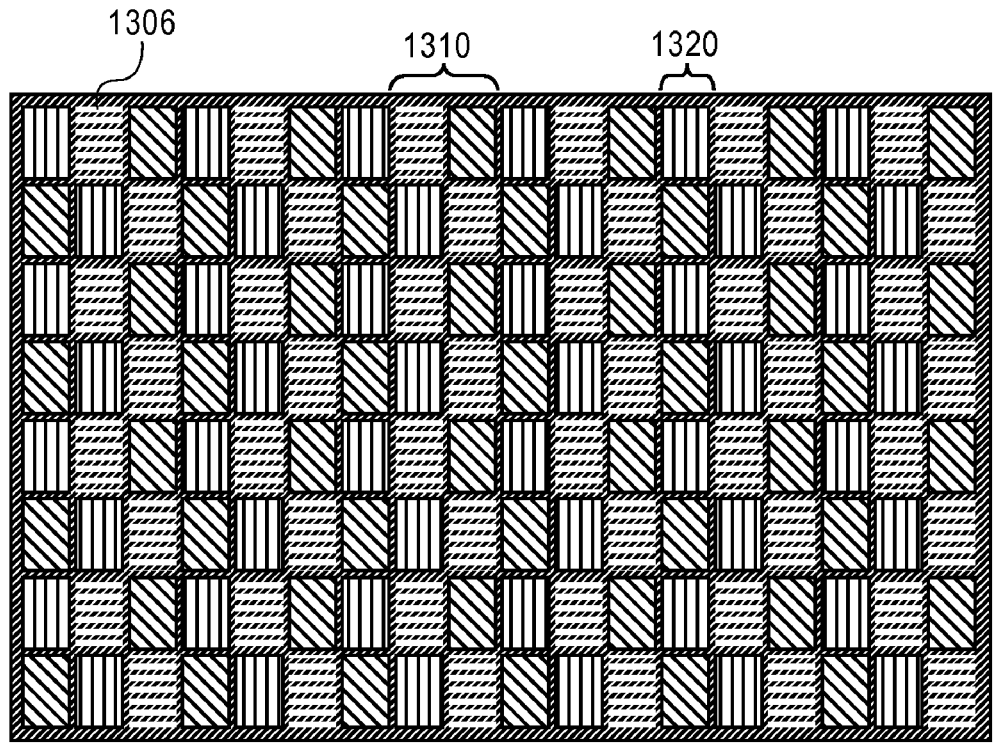
FIG. 13B illustrates the arrangement of FIG. 13A, as it would be perceived by the luminance channel of the human vision system, when a full white image is displayed.

In accordance with this additional aspect of the embodiments, FIGS. 13A, 13B, 14A, and 14B show how shifting the phase of the blue sub-pixels reduces the visibility of the dark luminance wells. FIG. 13A shows an arrangement 1312 of sub-pixels based in part on the arrangement of 8A with every other row copied from the one above and shifted by one sub-pixel to the right. This creates an arrangement of blue sub-pixels 1306 that takes two phases out of a three possible phases. FIG. 13B illustrates how the arrangement of FIG. 13A would be perceived by the luminance channel of the human vision system when a full white image is displayed. Note that the dark stripes 1310 have been reduced in amplitude but increased in width, when allowing for some luminance blending, while the white stripes 1320 have been reduced in both amplitude and width. This reduces the Fourier Transform signal energy, and thus the visibility of the stripes.

Figure 14A:
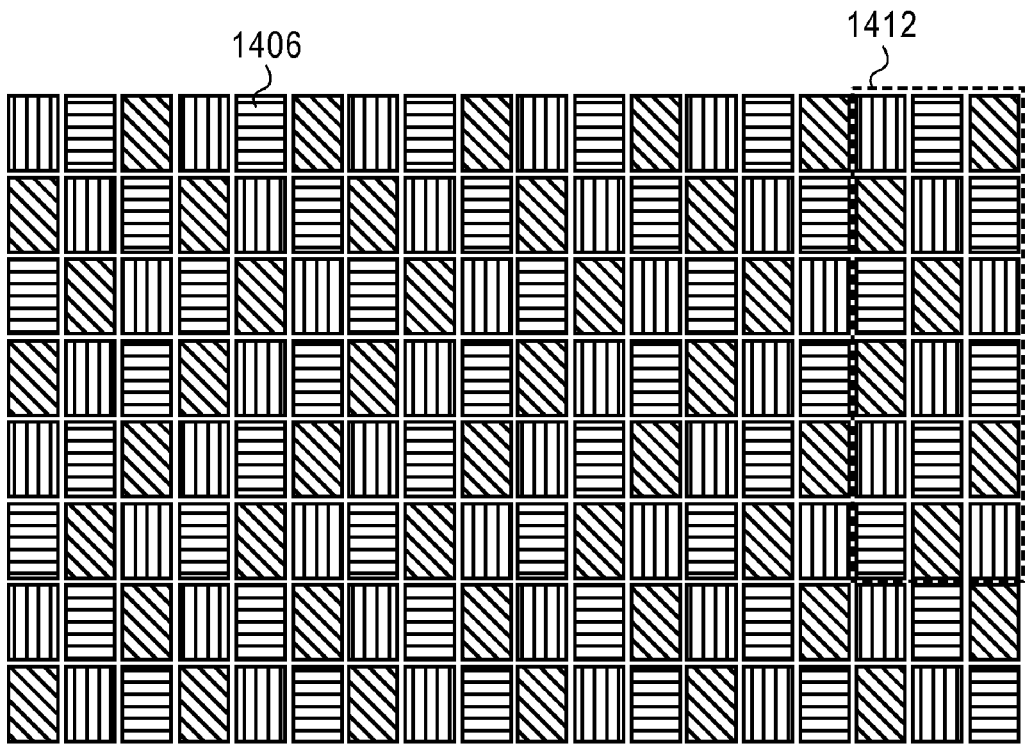
FIG. 14A shows an arrangement of three-color pixel elements in an array, in a single plane, for a display device.
Figure 14B:
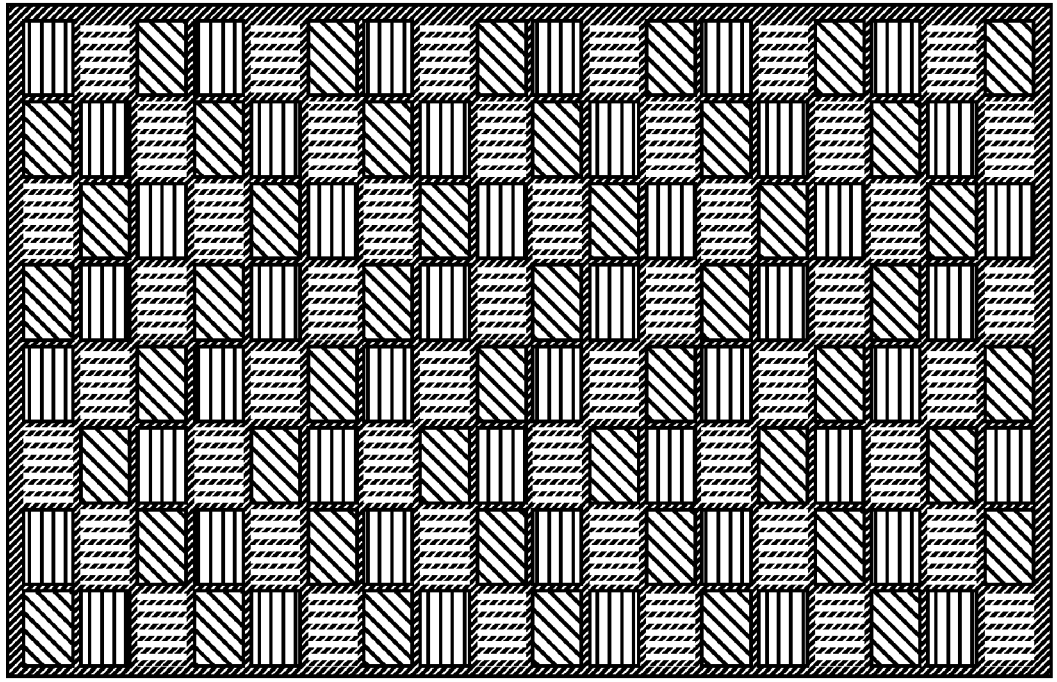
FIG. 14B illustrates the arrangement of FIG. 14A, as it would be perceived by the luminance channel of the human vision system, when a full white image is displayed.

FIG. 14A shows an arrangement of sub-pixel based in part on the arrangement of 13A with every third row is shifted by one sub-pixel to the right. This creates an arrangement 1412 in which the blue sub-pixels 1406 take three phases out of a three possible phases. FIG. 14B illustrates how the arrangement of FIG. 14A would be perceived by the luminance channel of the human vision system when a full white image is displayed. The various phases and angles scatter the Fourier Transform signal energy, and thus reduce the visibility of the blue sub-pixel caused luminance wells.

While the invention has been described with reference to exemplary embodiments, various changes may be made and equivalents may be substituted for elements thereof without departing from the scope of the invention. In addition, many modifications may be made to adapt a particular situation or material to the teachings without departing from the essential scope thereof. For example, some of the embodiments above may be implemented in other display technologies such as Organic Light Emitting Diode (OLED), ElectroLumenscent (EL), Electrophoretic, Active Matrix Liquid Crystal Display (AMLCD), Passive Matrix Liquid Crystal display (AM-LCD), Incandescent, solid state Light Emitting Diode (LED), Plasma Display Panel (PDP), and Iridescent. Further, more than one of the disclosed techniques can be used simultaneously for additive benefit; For example, the extra space described and shown in FIG. 9A, with the transistors and associated storage capacitors creating the space, may be combined with the optimally positioned optical vias described and shown in FIG. 12A, also perhaps with a narrower, but higher luminance, blue sub-pixel. Therefore, it is intended that the invention not be limited to any particular embodiment for carrying out this invention.

What is claimed is:

1. A transflective display panel substantially comprising:
a sub-pixel grouping comprising a plurality of at least first and second color sub-pixels, and forming an array across said display panel in a plurality of rows and columns;
said first color sub-pixels being substantially dark color sub-pixels as compared to the second color sub-pixels disposed in said sub-pixel grouping across said display panel so as to form a substantially vertical line on said display panel;
wherein each of the first and second color sub-pixels further comprises an optical via configured to transmit a backlight light from within the respective sub-pixel;
wherein said optical vias in the first color sub-pixels are formed in non-uniform positions;
wherein a relative position of a first optical via in one of the first color sub-pixels in the sub-pixel grouping is different from a relative position of a second optical via in an adjacent first color sub-pixel in the sub-pixel grouping.

2. The display panel as recited in claim 1 wherein forming said optical vias in non-uniform positions upon said dark color sub-pixels causes the phase of the reconstruction points of said dark color sub-pixels to shift; and further wherein said optical vias are formed upon said dark color sub-pixels such that the phase of the reconstruction points of said dark color sub-pixels is shifted in the vertical axis.

3. The display panel as recited in claim 1 wherein forming said optical vias in non-uniform positions upon said dark color sub-pixels causes the phase of the reconstruction points of said dark color sub-pixels to shift; and further wherein said optical vias are formed upon said dark color sub-pixels such that the phase of the reconstruction points of said dark color sub-pixels is shifted in the horizontal axis.

4. The display panel as recited in claim 1 wherein said sub-pixel grouping is comprised of two rows of sub-pixels, and wherein a dark color sub-pixel compared to the second color sub-pixels is disposed in each row of sub-pixels; and
   further wherein said optical vias are formed in non-uniform positions upon said dark color sub-pixels compared to the second color sub-pixels within said sub-pixel grouping.

5. The display panel as recited in claim 1 wherein said sub-pixel grouping is comprised of two row and three columns of sub-pixels, and wherein a dark color sub-pixel compared to the second color sub-pixels is disposed in each row of sub-pixels; and further wherein said optical vias are formed in non-uniform positions upon said dark color sub-pixels compared to the second color sub-pixels within said sub-pixel grouping.

6. The display panel as recited in claim 5 wherein said dark color sub-pixels disposed in each row of sub-pixels are further disposed in different columns of said sub-pixel grouping.

7. The display panel as recited in claim 1 wherein said sub-pixels are formed on said display panel with their lengthwise edges on a horizontal axis.

8. The display panel as recited in claim 1 wherein said first color sub-pixel includes a blue sub-pixel.

9. The display panel as recited in claim 1 wherein said second color sub-pixel includes at least one of a red sub-pixel and a green sub-pixel.

10. The display panel as recited in claim 1 wherein the sub-pixel grouping comprises a first sub-pixel grouping including first and second color sub- pixels and a second sub-pixel grouping including first and second color sub-pixels, the second sub-pixel being adjacent to the first sub-pixel grouping in a horizontal direction, and
    a position of an optical via in the first color sub-pixel of the first sub-pixel grouping is different from a position of an optical via in the first color sub-pixel of the second sub-pixel grouping.

11. The display panel as recited in claim 10 wherein a vertical position of the optical via in the first color sub-pixel of the first sub-pixel grouping is different from a vertical position of the optical via in the first color sub-pixel of the second sub-pixel grouping.

12. The display panel as recited in claim 10 wherein a position of an optical via in a second color sub-pixel of the first sub-pixel grouping is the same as a position of an optical via in a second color sub-pixel of the second sub-pixel grouping corresponding to the second color sub-pixel of the first sub-pixel grouping.

13. The display panel as recited in claim 10 wherein the first sub-pixel grouping includes a first second color sub-pixel adjacent to the first color sub-pixel in a first direction, and a second second color sub-pixel adjacent to the first color sub-pixel in a second direction opposite to the first direction, and
    a position of an optical via in the first second color sub-pixel of the first sub-pixel grouping is different from a position of an optical via in the second second color sub-pixel of the first sub-pixel grouping.

* * * * *